(12) United States Patent
Morioka et al.

(10) Patent No.: US 8,171,750 B2
(45) Date of Patent: May 8, 2012

(54) AIR CONDITIONER AND COATING COMPOSITION

(75) Inventors: Reiji Morioka, Tokyo (JP); Yoshinori Yamamoto, Tokyo (JP); Yasuhiro Yoshida, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 456 days.

(21) Appl. No.: 12/490,880

(22) Filed: Jun. 24, 2009

(65) Prior Publication Data

US 2010/0095697 A1 Apr. 22, 2010

(30) Foreign Application Priority Data

Oct. 17, 2008 (JP) ................................ 2008-268119

(51) Int. Cl.
*F25D 17/06* (2006.01)
(52) U.S. Cl. ............................................ 62/426; 62/513
(58) Field of Classification Search .................. 62/272, 62/426, 515, 419, 414, 314, 262, 513; 454/90, 454/236; 165/59, 48.1, 181
See application file for complete search history.

(56) References Cited

U.S. PATENT DOCUMENTS

| | | | |
|---|---|---|---|
| 6,245,854 B1 | 6/2001 | Obioha et al. | |
| 6,338,877 B1 | 1/2002 | Kamei et al. | |
| 6,692,223 B2 * | 2/2004 | Ikeda et al. | 415/53.1 |
| 6,718,787 B1 * | 4/2004 | Hille et al. | 62/279 |
| 6,722,152 B1 * | 4/2004 | Hille et al. | 62/262 |
| 6,729,154 B2 * | 5/2004 | Takashima et al. | 62/317 |
| 6,782,707 B2 * | 8/2004 | Shindo et al. | 62/264 |
| 6,786,061 B2 * | 9/2004 | Asami et al. | 62/263 |
| 6,892,551 B2 * | 5/2005 | Gunji et al. | 62/262 |
| 6,925,831 B2 * | 8/2005 | Park et al. | 62/262 |
| 7,337,626 B2 * | 3/2008 | Lee | 62/259.1 |
| 7,350,371 B2 * | 4/2008 | Lee et al. | 62/317 |
| 7,614,246 B2 * | 11/2009 | Yabu et al. | 62/259.1 |

(Continued)

FOREIGN PATENT DOCUMENTS

EP 1 788 042 A2 5/2007

(Continued)

OTHER PUBLICATIONS

Extended Search Report from European Patent Office issued in corresponding European Patent Application No. 09166730.3 dated Dec. 1, 2010.
Office Action (Notification of Rejection) dated Oct. 26, 2010, issued in the corresponding Japanese Patent Application No. 2008-268119, and an English Translation thereof.

*Primary Examiner* — Mohammad Ali
(74) *Attorney, Agent, or Firm* — Buchanan Ingersoll & Rooney PC

(57) ABSTRACT

Disclosed is an air conditioner coated by the coating composition to the resin-made components where due formation occurs upon the cooling operation, provides the antifouling performance against various stains, restrains enlargement of droplet, and provides an excellent long-term durability (sticking property and peeling off property) all at the same time. The air conditioner of the present embodiment forms a coating film 103 to surfaces of resin-made components and resin-made components installed to a rear flow side of the heat exchanger, includes the silica ultrafine particles 101 and the fluororesin particles 102, and provides, within the coating film 103, a silica film 104 comprising the silica ultrafine particles and the fluororesin particles 102 partially exposed from a surface of the silica film 104 in dots, and an exposed area of the silica film 104 is greater than an exposed area of the fluororesin particles 102.

8 Claims, 13 Drawing Sheets

U.S. PATENT DOCUMENTS

| | | | |
|---|---|---|---|
| 7,716,944 B2 * | 5/2010 | Murai | 62/419 |
| 7,731,477 B2 * | 6/2010 | Erni | 415/126 |
| 7,832,226 B2 * | 11/2010 | Nakamura | 62/298 |
| 7,900,469 B2 * | 3/2011 | Gildersleeve | 62/310 |
| 7,987,680 B2 * | 8/2011 | Hamada et al. | 62/186 |
| 8,038,517 B2 * | 10/2011 | Shibuya et al. | 454/187 |
| 8,074,462 B2 * | 12/2011 | Yasutomi et al. | 62/263 |
| 2003/0029183 A1 * | 2/2003 | Ohama et al. | 62/262 |
| 2006/0046633 A1 * | 3/2006 | Goupil et al. | 454/121 |
| 2006/0207325 A1 * | 9/2006 | Kataoka et al. | 73/335.01 |
| 2006/0225875 A1 * | 10/2006 | Uemura et al. | 165/203 |
| 2007/0012062 A1 * | 1/2007 | Yamashita et al. | 62/419 |
| 2007/0031250 A1 * | 2/2007 | Suzuki et al. | 415/220 |
| 2007/0089859 A1 * | 4/2007 | Wei | 165/80.4 |
| 2007/0098556 A1 * | 5/2007 | Sanagi et al. | 416/182 |
| 2007/0245757 A1 * | 10/2007 | Inoue et al. | 62/259.1 |
| 2007/0256816 A1 * | 11/2007 | Higashida et al. | 165/120 |

FOREIGN PATENT DOCUMENTS

| | | |
|---|---|---|
| JP | 4-018219 U | 2/1992 |
| JP | 4-344032 A | 11/1992 |
| JP | 5-097407 A | 4/1993 |
| JP | 08-247526 | 9/1996 |
| JP | 8-247526 A | 9/1996 |
| JP | 10-047890 A | 2/1998 |
| JP | 10-132483 A | 5/1998 |
| JP | 10-182189 | 7/1998 |
| JP | 2000-044861 | 2/2000 |
| JP | 2001-158606 A | 6/2001 |
| JP | 2001-172573 A | 6/2001 |
| JP | 2005-171068 | 6/2005 |
| WO | WO 2006/132668 A2 | 12/2006 |
| WO | WO 2008/072594 A1 | 6/2008 |

* cited by examiner

Fig. 9

| | SILICA ULTRAFINE PARTICLES CONCENTRATION (%) | FLUORORESIN PARICLES CONCENTRATION (%) | SOLID CONTENT WEIGHT RATIO BETWEEN SILICA AND FLUORINE |
|---|---|---|---|
| PRACTICAL EXAMPLE1 | 0.5 | 1.2 | 30 : 70 |
| PRACTICAL EXAMPLE2 | 0.5 | 0.5 | 50 : 50 |
| PRACTICAL EXAMPLE3 | 0.8 | 0.5 | 60 : 40 |
| PRACTICAL EXAMPLE4 | 1.5 | 0.5 | 75 : 25 |
| PRACTICAL EXAMPLE5 | 2.8 | 0.5 | 85 : 15 |
| PRACTICAL EXAMPLE6 | 2.3 | 0.25 | 90 : 10 |
| PRACTICAL EXAMPLE7 | 2.0 | — | 100 : 0 |
| COMPARATIVE EXAMPLE1 | — | — | PS (NON-COATED) |
| COMPARATIVE EXAMPLE2 | — | — | PS (PVC COATED) |
| COMPARATIVE EXAMPLE3 | 6.3 | 0.7 | 90 : 10 |

Fig.10

| CHARACTERISTIC OF COATING FILM | INITIAL CONTACT ANGLE (°) | KWANTO LOAM SAND AND DUST ADHERENCE (HYDROPHILIC) | CARBON POWDER DUST ADHERENCE (HYDROPHOBIC) |
|---|---|---|---|
| PRACTICAL EXAMPLE1 | TRANSPARENT FILM | 38 | 1 | 3.5 |
| PRACTICAL EXAMPLE2 | TRANSPARENT FILM | 24 | 1.5 | 3 |
| PRACTICAL EXAMPLE3 | TRANSPARENT FILM | 20 | 1 | 2.5 |
| PRACTICAL EXAMPLE4 | TRANSPARENT FILM | 18 | 1 | 1.5 |
| PRACTICAL EXAMPLE5 | SUBTLY NON-TRANSPARENT FILM | 16 | 2 | 1 |
| PRACTICAL EXAMPLE6 | TRANSPARENT FILM | 14 | 3 | 1 |
| PRACTICAL EXAMPLE7 | TRANSPARENT FILM | 12 | 4 | 3.5 |
| COMPARATIVE EXAMPLE1 | — | 80 | 4.5 | 4.5 |
| COMPARATIVE EXAMPLE2 | TRANSPARENT FILM | 21 | 4 | 3.5 |
| COMPARATIVE EXAMPLE3 | PEELING NON-TRANSPARENT FILM | — | — | — |

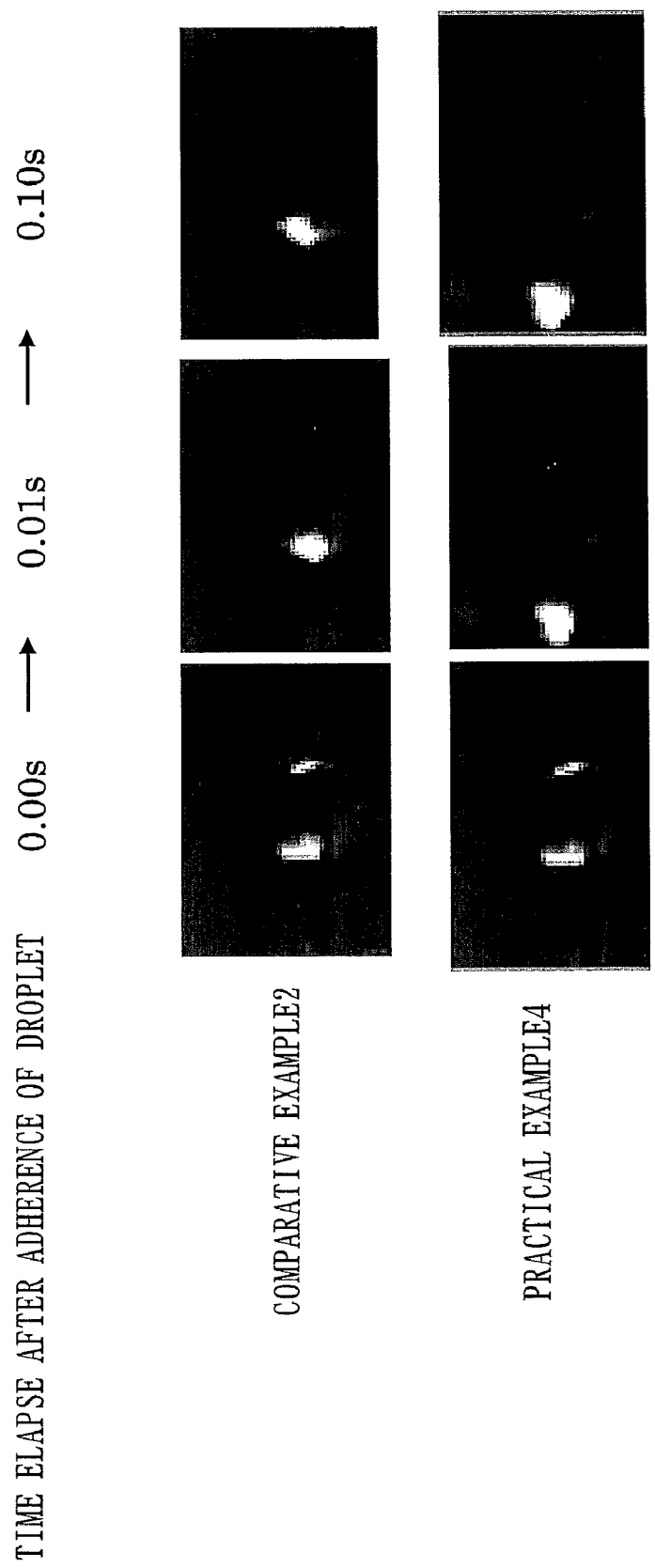

AIR CONDITIONER AND COATING COMPOSITION

BACKGROUND OF THE INVENTION

1. Field of the Invention

The present invention relates to an air conditioner that prevents dew formation and adherence of stains having various properties, on/to resin-made components installed to a rear flow side of the heat exchanger, both at the same time, during the cooling operation. Also, the present invention relates to a coating composition that can provide either one of an antifouling property or a hydrophilic property to the coating resin thereon.

2. Description of the Related Art

In the air conditioner that conditions the air inside a room by blowing out the cool air, during the cooling operation, a casing unit (forms an airflow route) and louvers at a periphery of the outlet vent are cooled down below a dew-point temperature of the indoor air surrounding the air conditioner by the cool air blown out. For this reason, the condensation occurs, and when the cooling operation continues for a long time, the condensate water enlarges into a large droplet, which eventually drips down to make a floor wet. Even if the dew does not drip, when the droplet is retained there and not dried for a long time, a black or blue mold may grow by taking nutrients from the stains that became adhered by collision of the air. Bad odors are generated therefrom, and mold spores are released inside the room.

In order to prevent the dew formation on the resin-made components placed in the airflow route of this air conditioner, for example, the patent document 1 discusses the coating of the periphery of the outlet vent of the main body with a paint having the hydrophilic property, for promoting shifting of the condensate water by weakening its surface tension.

Moreover, the patent document 2 discusses the coating with a paint having the hygroscopic property by blending zeolite of 5% by mass into an acryl emulsion type paint, which is a paint having the hygroscopic property, thereby preventing the condensation.

There are other methods such as absorbing of the condensate water adhered to filaments pasted near the outlet vent and the casing unit, and depriving temperature difference by pasting a heat insulating material.

These conventional approaches of the dew prevention, however, are coating with the paints having the hydrophilic property and the hygroscopic property. Although a certain effect of restraining the droplet enlargement is observed to some extent, however, when the airborne particles inside the room sucked in by the ventilation fan, such as dusts and sands, collide to wall faces of the high-speed components in a vicinity of the casing unit and the outlet vent, because their surfaces are hydrophilic, the stain having the hydrophilic property is easily adhered. When the stains accumulate, the stains are retained together with the condensed moisture, making them difficult to evaporate. There is an increased risk of preparing an environment ideal for the mold growth, nutrients such as the stains, moisture, air and high humidity. Accordingly, macroscopically, there is a need for a way to provide a method of preventing adherence of various stains having amphiphilic properties, at the same time as restraining the droplet enlargement by utilizing the hydrophilic property.

For example, the patent documents 3 and 4 discuss various measures for restraining various stains, such as powders, dusts, greasy fumes, tar of cigarette, and the like, that cohere on the surfaces of various products used either indoor or outdoor. For example, the patent documents 3 and 4 discuss prevention and easy removal of stains having an oilphilic property by coating the product surface with an oil-repellant fluororesin or an antistatic agent. In the coating employed to the air conditioner, in order to prevent a droplet bridge formation to the heat exchanger, the coating composition having the antifouling property microscopically disperses an optical catalytic oxide and a water-repellant fluororesin, and the applied surface is exposed to come in contact with the outside air, and a contact angle θ formed by the film surface and water is made 90 degrees or above.

[Patent Document 1] Japanese Published Patent Application No. 4-344032

[Patent Document 2] Japanese Published Patent Application No. 8-247526

[Patent Document 3] Japanese Published Patent Application No. 10-132483

[Patent Document 4] Japanese Published Patent Application No. 10-47890.

SUMMARY OF THE INVENTION

The conventional approaches of the patent documents 3 and 4, however, offers the hydrophilic property partially by generating the optical excitation to the optical catalytic oxide by irradiating the light, such that there were problems of not being able to obtain an ideal antifouling performance when the light irradiation is not sufficient. They were merely the coating films having the contact angle formed by the film surface and water is made 90 degrees or above, and unable to achieve the hydrophilic property macroscopically. Therefore, a method that can provide both the high hydrophilic property and the high antifouling performance to the resin-made components is not been found.

In addition, these methods use non-organic materials having the hydrophilic property, such as titanium oxide and silica, which have a poor affinity with a water-repellant organic type resin-made component to result in a poor firmly adhering property. For this reason, there is a major problem of not tolerating a long-term use, such as peeling off of the coating film, causing unpainted portion due to difficulty in painting, and deteriorating the antifouling performance in a short time.

The present invention, in attempt to solve the above-mentioned problems, is directed to the air conditioner coated by the coating composition onto the resin-made components where the dew formation occurs during the cooling operation, for providing the antifouling performance against various stains, for restraining the droplet enlargement, and having an excellent long-term durability (firmly adhering property and peeling off property), all at the same time. The present invention is also directed to the coating composition providing either one of the antifouling property or the hydrophilic property to the coating resin thereon.

According to one aspect of the present invention, an air conditioner comprises a chassis; a ventilation fan that sucks air and blows out the sucked air; a heat exchanger that exchanges heat between the sucked air and a refrigerant in a refrigerating cycle, arranged inside an airflow route formed by the ventilation fan; resin-made components installed to a rear flow side of the heat exchanger; and a coating composition that forms a coating film on surfaces of the resin-made components, that includes silica ultrafine particles and fluororesin particles, wherein the coating film comprises a silica film comprising the silica ultrafine particles and the fluororesin particles partially exposed from a surface of the silica film in dots, and an exposed area of the silica film is greater than an exposed area of the fluororesin particles.

The air conditioner of the present invention prevents the dew formation of the resin-made components and the stain adherence lasting over a long time, both at the same time. The air conditioner of the present embodiment forms a coating film including the silica ultrafine particles and the fluororesin particles on surfaces of resin-made components installed to the rear flow side of the heat exchanger, and provides, within the coating film, a silica film comprising the silica ultrafine particles and the fluororesin particles partially exposed from the surface of the silica film in dots, and an exposed area of the silica film is greater than an exposed area of the fluororesin particles.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute apart of the specification, illustrate exemplary embodiments, features, and aspects of the invention and, together with the description, serve to explain the principles of the invention.

FIG. 9 is a chart showing preparation of the coating composition 200 of the practical examples 1 to 7 and the comparative examples 1 to 3.

FIG. 10 is a drawing showing a property of the coating film 103, an initial contact angle θ, and the antifouling property, for the practical examples 1 to 7 and the comprehensive examples 1 to 3.

FIG. 11 is high-speed camera images showing the behavior of the droplets on the surfaces of the practical example 4 and the comparative example 2, for comparison.

DESCRIPTION OF THE EXEMPLARY EMBODIMENTS

Figure 1:
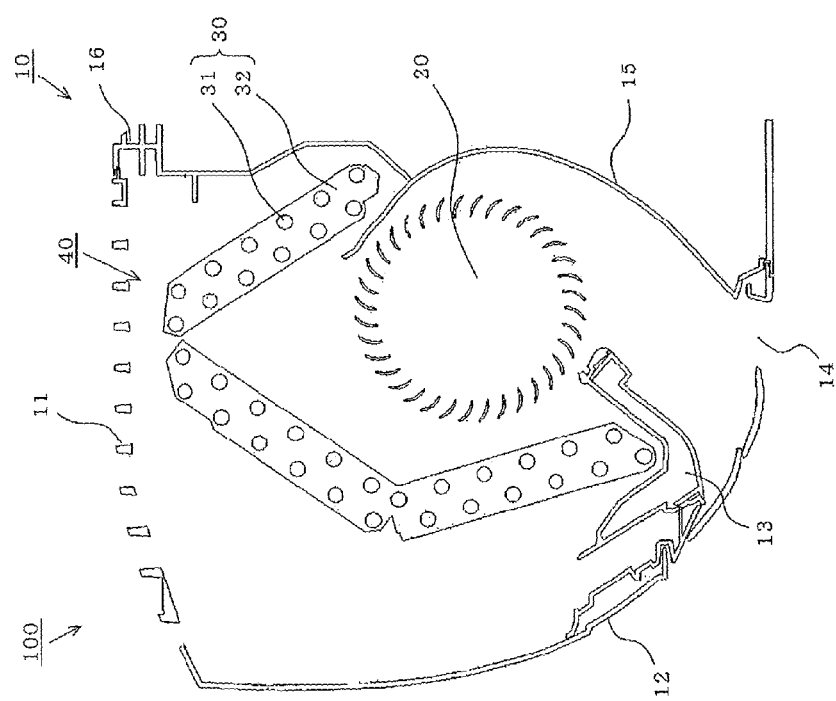
FIG. 1 is a schematic sectional view of a central portion of the air conditioner 100, in accordance with the embodiment 1.

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

Hereinbelow, the air conditioner and coating composition relating to the embodiment of the present invention will be described with reference to the drawings. The identical reference numerals are used for the portions that correspond to their equivalents, and some of the explanations are omitted for this reason.

Embodiment 1

FIG. 1 is a sectional view that schematically shows a roughly central portion of the air conditioner 100 seen from the side, in accordance with the embodiment 1. Referring to FIG. 1, the air conditioner 100 comprises a chassis 10, a ventilation fan 20 provided inside the chassis 10, that sucks in air and blows out the sucked air, a casing unit 15 that guides the air blown out by the ventilation fan 20, a heat exchanger 30 that conditions the sucked air by exchanging heat with the refrigerant in the refrigerating cycle, a filter 40 that captures dusts contained in the sucked air, right and left flaps 13 that direct the air blown out to the right and left directions, an upper flap 16 and a lower flap 17 that direct the air blown out to the upper and lower directions, and a frontal grill 12 for opening and closing. Hereinbelow, each component will be described separately.

The ventilation fan 20 is placed at roughly a central portion of the chassis 10, viewed from the side, and is positioned on the airflow route from the air inlet vent 11 to the air outlet vent 14.

The casing unit 15 determines a blow-out direction of the ventilation fan 20, and extends from a rear part of the ventilation fan 20 to the air outlet vent 14.

The heat exchanger 30 is placed between the air inlet vent 11 and the ventilation fan 20, and conditions (cools, heats, dehumidifies, etc.) the sucked air by exchanging heat with the refrigerant in the refrigerating cycle.

Sometimes, a high-speed air may blasts to the casing unit 15, and dews splattered via the heat exchanger 30 may adhere thereon.

The right and left flaps 13 are planer louvers having various external shapes made of a resin, installed in plural numbers in a width direction of the indoor unit (called "air conditioner 100" in FIG. 1), and have a role of delivering the air blown out to the right and left directions.

The upper flap 16 and the lower flap 17 are louvers made of a resin, having an approximately circular arc shape in cross section, installed across a width direction of the air outlet vent 14 of the indoor unit, and have a role of delivering the air blown out to the upper and lower directions. The right and left flaps 13, the upper flap 16, and the lower flap 17 can change their angles automatically by motors which are not illustrated. In this drawing, the upper and lower flaps are divided into the upper flap 16 and the lower flap 17, however, they do not need be separated into two. They can be made as a single flap. Alternatively, they may be configured in plural numbers more than two. Further, they may be divided in plural numbers in the right and left directions.

In the drawing, the heat exchanger 30 of the present embodiment is being placed to surround, but not limited to, a top face side and a frontal face side of the ventilation fan 20. Also, the heat exchanger 30 of the present embodiment provides, but not limited to, a heat transmitting tube 31 and a radiating fin 32 penetrated through by the heat transmitting tube 31.

Hereinbelow, a coating composition for resins that produces an excellent antifouling performance against both a hydrophilic contaminated substance 105 and a hydrophobic contaminated substance 106, is described with reference to the drawings.

Figure 2:
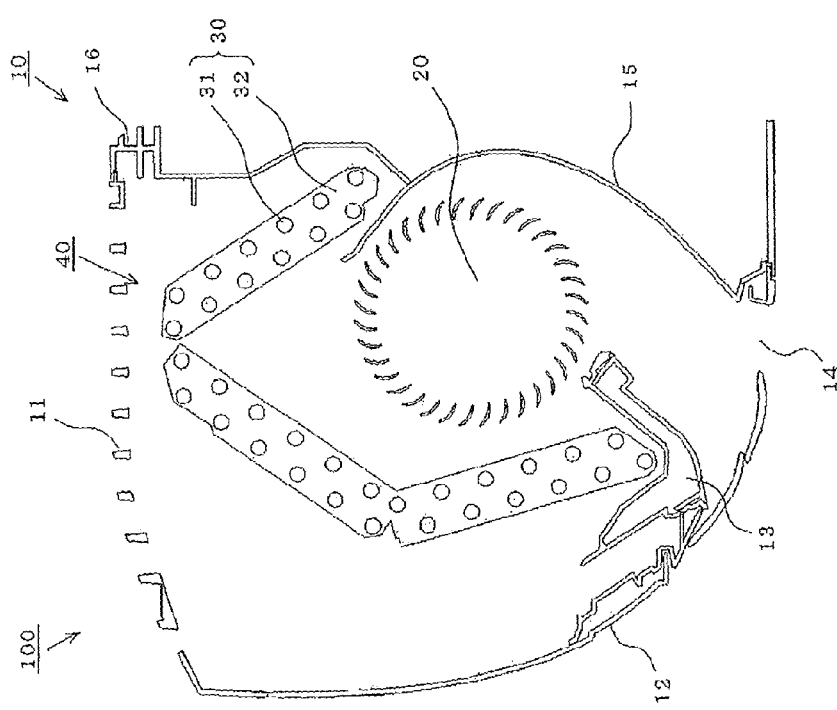
FIG. 2 is a sectional view showing coating components of the air conditioner shown in FIG. 1.

FIG. 2 is a sectional view that schematically shows a roughly central portion of the air conditioner 100, viewed from the side, in accordance with the embodiment 1. The coated portion painted with the coating composition 200 of the present embodiment producing the effect is encompassed with a thick black line.

Referring to FIG. 2, the casing unit 15, the right and left flaps 13, the upper flap 16 and the lower flap 17 are indicated by the thick black line or encompassed with the thick black line. These resin-made components are subjected to concerns of the dew formation, whereby the moisture from the dew and various stains that became adhered to these components may cause fungus growth such as black mold and blue mold. Thus, these components are most appropriate for applying the coating composition 200 of the present embodiment.

Moreover, the coating composition 200 may be applied to a lower face of the nozzle 18 since the dews are easily adhered during an upward wind direction.

Since the stain particles frequently collide to edges of blades of the ventilation fan 20, therefore, the stains are liable to be accumulated thereon. Fungus will grow when the moisture is retained, and eventually the mycelial elongation fills up the blades, to generate odors and prominently decrease the amount of air flow. For these reasons, the edges of blades are ideal portions for applying the coating composition 200.

The casing unit 15, the right and left flaps 13, the upper flap 16, the lower flap 17, the nozzle 18, and the ventilation fan 20 (the edges of blades) will be generically called "resin-made components installed to the rear flow side of the heat exchanger".

Figure 3:
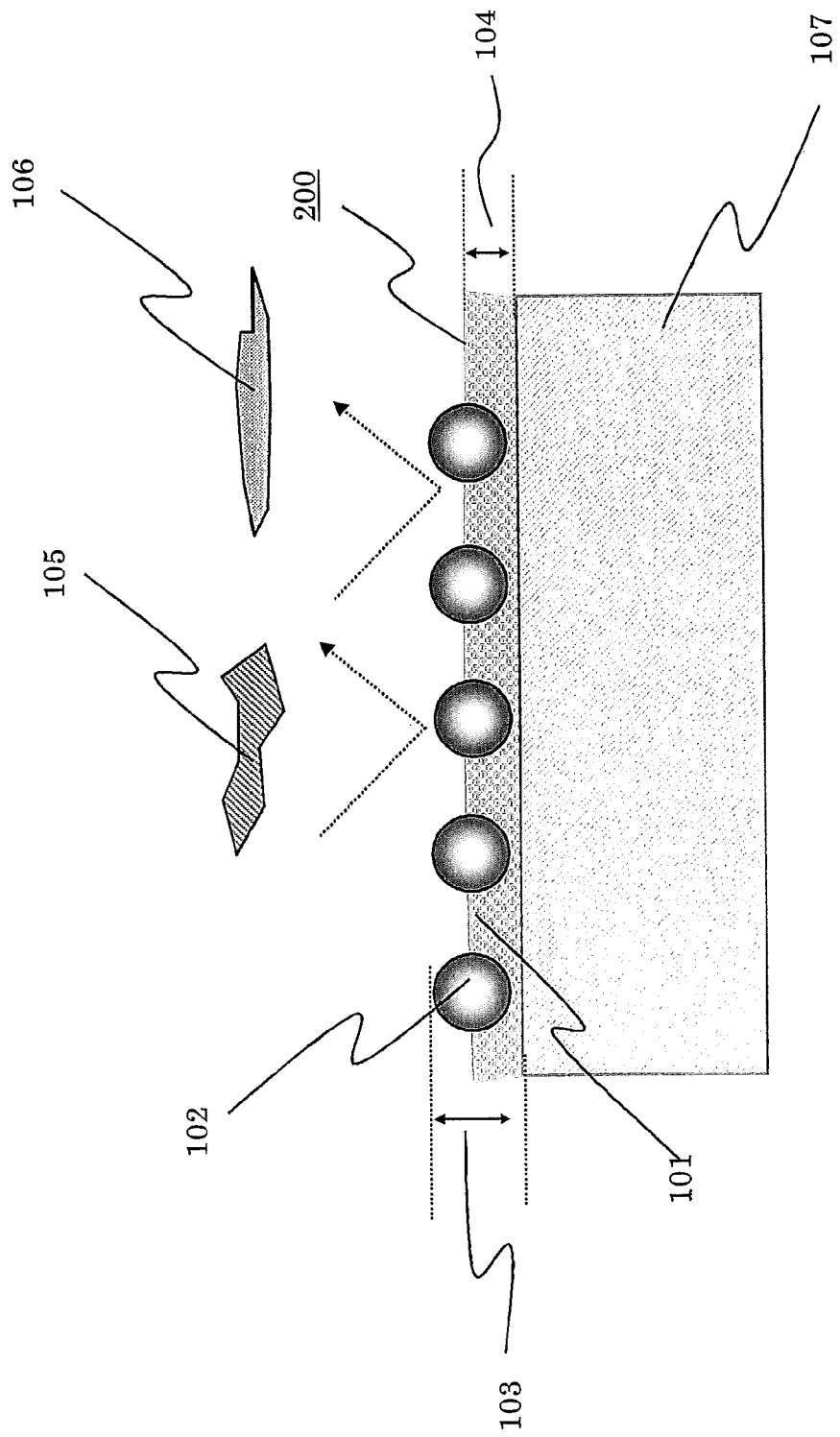
FIG. 3 is a conceptual drawing showing the sectional view of a coating film 103 formed by coating a coating composition 200 on the resinous surface, in accordance to embodiment 1.
Figure 4:
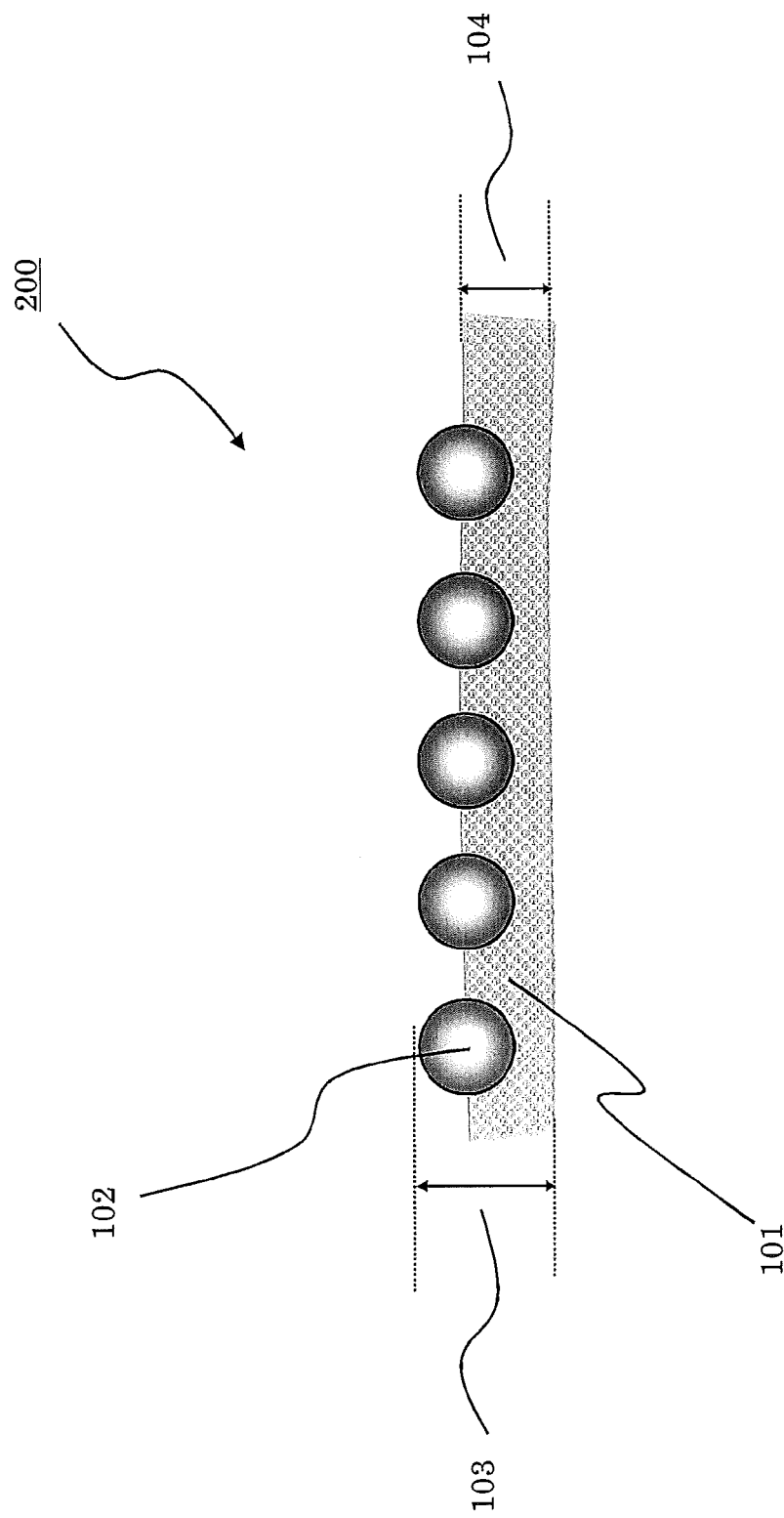
FIG. 4 is a conceptual drawing only showing the coating film 103 of FIG. 3.
Figure 5:
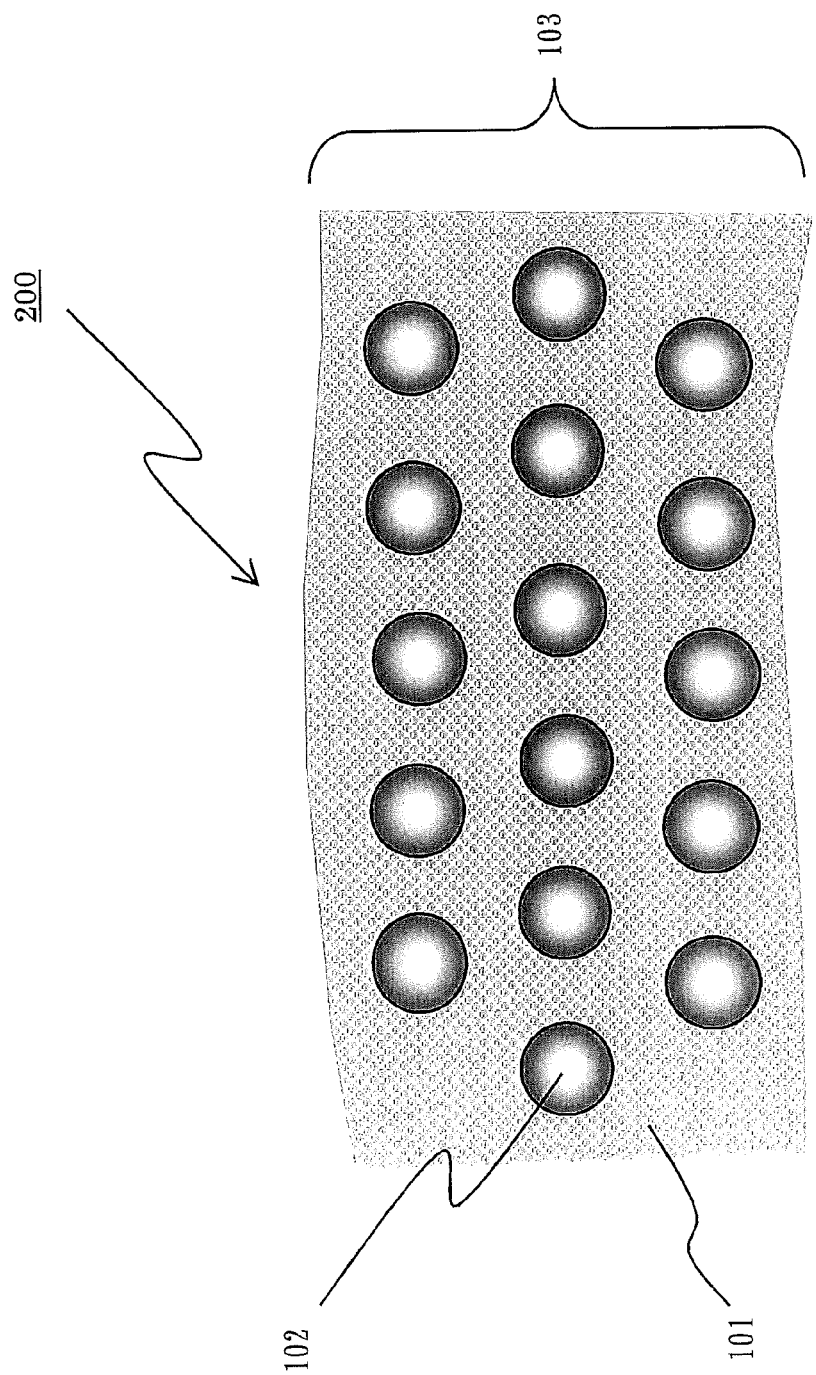
FIG. 5 is a conceptual drawing of the coating film 103 of FIG. 4.

FIGS. 3 to 5 illustrate the first embodiment. FIG. 3 is a conceptual drawing, in a cross-sectional view, of the coating film 103 formed by coating the resin-made components, the coating products, by the coating composition 200. FIG. 4 is a conceptual drawing only showing the coating film 103 of FIG. 3, viewed from the above. FIG. 5 is a conceptual drawing showing the upper face of the coating film 103 of FIG. 3 or 4. Any one of FIGS. 3 to 5 shows formation of the coating film 103 after the coating composition 200 is dried.

According to the coating composition 200 of the first embodiment, in the dried state, the fluororesin particles 102 having the hydrophobic property are dottedly embedded within the silica film 104 having the hydrophilic property and comprising the silica ultra fine particles 101. The coating film 103 is configured so that the fluororesin particles 102 are partially and not totally exposed from the silica film 104.

Silica ($SiO_2$) is a silicon oxide that occupies approximately 60% of the entire earth's crust. It produces an excellent characteristics in various fields, by forming a synthetic silica having a porous and large surface area by chemically reacting the quartz sand mainly as a raw material. Silica, together with its chemical stability, is receiving much attention in a wide range of fields.

The coating composition 200 is obtained by mixing a liquid (the dispersion liquid) that disperses the silica ultrafine particles 101 and a liquid (the dispersion liquid) that disperses the fluororesin particles 102. Before the formation of the coating film 103, the coating composition 200 is in a liquid phase where the silica ultrafine particles 101 and the fluororesin particles 102 are dispersed within water. After a product is immersed into the dispersion liquid, followed by a removal of excessive moisture by drying, the coating film 103 is formed on the product surface. The silica film 104 in the coating film 103, followed by bonding of silicon (Si) and oxygen (O), will have an OH-group on its surface.

Herein, as shown in FIG. 4, a layer coated by the coating composition 200 formed on the product surface is called the coating film 103. In the coating film 103, the fluororesin particles 102 are dottedly embedded within the silica film 104 containing the silica ultrafine particles 101, and the fluororesin particles 102 are partially and not totally exposed from a surface of the silica film 104. Herein, basically, the coating composition 200 indicates a phase which is generally called the coating solution, which is a phase of the dispersion liquid.

When a light scattering method is used to measure an average particle diameter of the silica ultrafine particles 101 used in the coating composition 200, the average particle diameter is found to be not more than 15 nm, and preferably 4 to 12 nm. The light scattering method can be used to measure the particle diameters. The silica ultrafine particles 101 having an extremely small average diameter such as these, in the phase of the coating solution where these particles are dispersed in the water, their entire surfaces that are in contact with the water is partially dissolved to the water by equilibrium (i.e. the surface portion in contact becomes a substance having an intermediate property of silica and water), so that when the coating composition 200 is dried, the partially dissolved nature of a silica component acts as a binder that connects the silica ultrafine particles 101 with one another (a binding agent that solidify the particles), thereby facilitating agglomeration and solidifying of the silica ultrafine particles 101 without adding a special binder. For this reason, the silica film 104 having an excellent strength, without the crack formation, is achieved. Not only the silica film 104, but also the coating film 103 is acquired.

For the average particle diameter of the silica ultrafine particle 101 ranging from 4 to 15 nm, a partially water dissolved surface component of a single ultrafine particle 101 in the coating solution corresponds to about 15 to 30% by weight of the weight of the silica ultrafine particle 101. However, when the silica ultrafine particles have the average particle diameter exceeding 15 nm, that is, the greater the diameter, the lesser the weight of silica component in the partially water dissolved state in the coating solution against the weight of the silica ultrafine particle 101. Since the effect of binder cannot be achieved, the coating film 103 formed does not have a sufficient strength which would not be ideal for the coating film 103 due to the crack formation. A separate binder needs to be added for this reason.

In contrary, when the silica ultrafine particles have the average particle diameter less than 4 nm, a proportion of the silica component in the partial water dissolved state becomes too high in the coating solution, and the silica ultrafine particles become agglomerated with one another within the coating solution. Thus, the stability as the coating composition 200 cannot be acquired. Also, a sufficient strength of the silica film 104 formed after drying (the coating film 103) and a desirable antifouling performance, which will be described later, cannot be acquired.

Also, a particle diameter of the silica ultrafine particle 101 influences an external property such as a transparency of the coating film 103 formed. For those silica ultrafine particles 101 having the average particle diameter of not more than 15 nm, the coating film 103 improves its transparency because scattering of lights being reflected therefrom become less, thereby controlling the change in tone and color of the coating product without impairing the tone and color of the coating product.

Also, when the silica ultrafine particles having the average particle diameter of not more than 15 nm is used as the silica ultrafine particle 101, the silica film 104 obtained, in the coating film 103, possess a very fine and minute gap between the silica ultrafine particles 101. Compared to the conventional and typical silica film which does not use silicate or ultrafine particles formed by sol-gel method, or a silica film formed by adding an organic or inorganic soluble binder, the silica film 104 of the present embodiment can be formed thinly, and a smooth surface is formed by minimizing unevenness caused by the silica ultrafine particles on the surface of the silica film 104, thereby increasing the antifouling performance since the stain substances will not be caught.

The content of silica ultrafine particles 101 in the coating composition 200 is 0.1 to 5% by weight of the coating composition 200, preferably 0.3 to 2.5% by weight. The content (concentration) of the coating composition 200 in this range is used to form a liquid film on a surface of the coating product (for example, the resin-made components such as the casing unit 15, the right and left flaps 13, the upper flap 16, and the lower flap 17) by immersion or showering, followed by drying of the solution which is washed away or forcibly removed. As a result of coating accordingly, a thickness of the coating film 103 formed is about 50 to 500 nm, and the uniform thickness without the unevenness of the silica film 104 is obtained. The coating film 103 is formed without impairing the tone and color of the surface of the coating product.

When the content of the silica ultrafine particles 101 is less than 0.1% by weight, the silica film 104 becomes too thin, which causes problems such as partial weakening of the silica film 104, and non-coated portions of the coated product, which is not at all ideal as the coating composition 200.

On the other hand, when the content of the silica ultrafine particles 101 exceeds 5% by weight, the silica film 104 becomes too thick to result in a non-transparent film, thereby impairing the tone or color of the surface of the coating product. Also, because a weight proportion of the silica ultrafine particles 101 itself is large, the binder effect of the silica component in the partially water dissolved state of the coating solution as described above becomes difficult, and a solid state of the silica ultrafine particles 101 after drying becomes weak. The silica film 104 deteriorates physically due to peeling off or crack formation.

Next, the fluororesin particle 102 used in this coating composition 200 will be described. In the coating film 103, an average particle diameter of the fluororesin particles 102 in use that are embedded within the silica film 104 in dots and partially (not totally) exposed from the silica film 104, is ranging from 50 to 500 nm, more preferably 100 to 250 nm. The light scattering method measures the particle diameter. The particle diameter of the fluororesin particle 102 is greater than the thickness of the silica film 104, in order for the fluororesin particles to appropriately disperse in the coating film 103 formed, and the fluororesin particles 102 are partially exposed easily on the surface of the coating film 103 (i.e., from the surface of the silica film 104). Accordingly, the coating film 103 can acquire the desired state by using the particle diameter in this range.

When the average particle diameter of the fluororesin particles 102 is less than 50 nm, the fluororesin particles 102 become agglomerated and consolidated in the coating solution, in which case the stability of their characteristics cannot be achieved. As for the coating film 103 formed, the fluororesin particles 102 cannot be exposed from the surface of the silica film 104, so that the antifouling performance, which will be described later, may not be obtained.

On the other hand, when the average particle diameter of the fluororesin particles 102 exceeds 500 nm, the portion of the fluororesin particles 102 to be exposed from the surface of the coating film 104 becomes too much in the coating film 103 formed. In this state, an area of the portion indicating the hydrophobic property on the surface of the coating film 103 becomes too much, and the antifouling property, which will be described later, cannot be obtained. Moreover, the unevenness of the surface of the coating film 103 becomes too large, and the staining substances (stains) are easily caught and adhered, and the adhered staining substances cannot be removed easily.

In the coating film 103 formed on the surface of the coating product after drying the coating composition, the thickness of the silica film 104 in the coating film 103 is less than the average particle diameter of the fluororesin particles 102. By controlling the thickness of the silica film 104 thinner than the average particle diameter of the fluororesin particles 102, the fluororesin particles 102 are appropriately dispersed within the silica film 104 in dots in the coating film 103 formed, which are partially (not totally) exposed from the surface of the silica film 104. Accordingly, the coating film 103 can acquire the ideal state.

For example, when the fluororesin particle 102 having the average diameter of 150 nm is used, the thickness of the silica film 104 is controlled to be less than 100 nm. That is, the thickness of silica film 104 is set to be less than ⅔ of the average particle diameter of the fluororesin particles 102. Accordingly, in order to form the silica film 104 to have a thin film thinner than 100 nm, prior to solidification of the silica ultrafine particles 100 at the surface of the coating product, the coating solution on the surface of the coating product is air blown at high speed. At this time, factors such as blowing speed, blowing time, and blowing temperature are adjusted to control the thickness of the silica film 104.

A weight ratio of the silica ultrafine particles 101 and the fluororesin particles 102 in the coating composition 200 (a weight of the silica ultrafine particles 101: a weight of the fluororesin particles 102) is from 50:50 to 95:5, and preferably 75:25. As long as the weight ratio is within this range, the coating film 103 having an area for hydrophilic property of the silica ultrafine particles 101 (the silica film 104) and an area for hydrophobic property of the fluororesin particle 102, existing together in a good balance, can be obtained by drying at a room temperature. The good balance of these areas for the hydrophilic property and the hydrophobic property influences the antifouling performance, which will be described later.

However, even when a homogeneous silica film 104 is formed by using the silica ultrafine particles 101 solely, although the antifouling effect will be restricted to a great extent, this homogeneous silica film 104 has an effect of avoiding the hydrophobic property particles such as greasy fumes, and an effect of decreasing the an intermolecular force and an electrostatic force of the surface, thereby improving the resistance to stains compared with the case of not applying the coating.

Meanwhile, the antifouling performance (the antifouling property) of the coating film 103 formed by this coating composition 200 will be described. "Staining" is defined as adhering of the staining substance onto the product surface, which becomes cohered on the product surface without being removed. For this reason, prevention of stains on the product is an attempt for not allowing the staining substances to cohere on the product surface, or an attempt for easy removal of the staining substances from the surface before it becomes cohered on the surface even if the staining substance adheres on the product surface.

"Antifouling performance" is a property in which the staining substance does not cohere on the surface, and a property in which the staining substance is easily seceded (removed) from the surface without cohering even if the staining substance becomes adhered. We refer to the coating composition 200 (the coating film 103) that can bring the product surface to have an excellent antifouling performance as having a high grade of antifouling performance, or the coating composition 200 (the coating film 103) having the excellent antifouling performance. Herein, a term "adhering" is used to refer to the a in which the staining substance is comparatively easily removed from the surface, including the state of simply sitting on the surface, and a term "cohering" is used to refer to a state of not being able to remove that easily from the surface. The two terms are distinctively used.

There are two types of staining substances causing the stains, namely the hydrophilic staining substance 105 and the hydrophobic staining substance 106. The hydrophilic staining substance 105 is easily adhered to portions indicating the hydrophilic property, and does not adhere to portions indicating the hydrophobic property. And vice versa for the hydrophobic property staining substance 106. The hydrophilic staining substance 105, such as sands and dusts, adheres to the area of the hydrophilic property of the product surface (includes the surface of the coating film 103), due to the following reasons: an electrostatic binding of the hydrophilic staining substance 105 with the OH-bases existing on the area of the hydrophilic property of the product surface; the intermolecular force occurring between the hydrophilic staining substance 105 and the area of the hydrophilic property of the product surface as they approach one another; or a liquid bridge intervened by a liquid such as water.

The hydrophilic staining substance 105, such as airborne sands, is a minute particle having a size ranging from several µm to several tens of µm. Also, the hydrophilic staining substance 105, the dusts, which is by far much larger than the sands, have a size ranging from of 0.1 mm to 5 mm. For the hydrophilic staining substance 105 to cohere on the area of the hydrophilic property of the product surface by the above-described effect, there must be a sufficient area of the hydrophilic property, for the hydrophilic staining substance 105 to stick (come into contact) with the area of the hydrophilic property of the product surface.

However, in the coating film 103 formed by the coating composition 200 of the present embodiment, the fluororesin particles 102 indicating the hydrophobic property are appropriately dispersed in dots within the silica film 104 indicating the hydrophilic property, such that there exist no continuous area at all on the surface on the silica film 104 for the hydrophilic staining substance 105 to stably stick. The hydrophilic staining substance 105 adhered on the coating film 103 cannot stick to the surface of the silica film 104 sufficiently, due to the following reasons: the hydrophobic property of the surface of the fluororesin particles 102 protruded (exposed) from the silica film 104; or a physical impediment of the protruded fluororesin particle 102. For this reason, the hydrophilic staining substance 105 is readily removed, and does not cohere to the coating film 103.

Also, the silica film 104, comprised of the silica ultrafine particles 101 (the silica component of the silica ultrafine particle 101 also has a role of the binder), is low in density being a porous film having minute gaps in between the silica ultrafine particles 101. Even if the hydrophilic staining substance 105 approaches, the intermolecular force between them is small, therefore, it is difficult for the hydrophilic staining substance 105 to cohere.

Further, since the silica film 104 is porous having minute gaps in between the silica ultrafine particles 101, even if the liquid bridge such as water occurs therein, the liquid bridge vanishes because the water between the hydrophilic staining substance 105 and the surface of the silica film 104 flows out through the minute gaps of the silica film 104, so that the hydrophilic staining substance 105 does not become cohered by the liquid bridge.

Accordingly, the coating film 103 formed by this coating composition 200 produces the excellent antifouling performance against the hydrophilic staining substance 105.

When the content of silica ultrafine particles 101 in the coating composition 200 is the weight ratio of the silica ultrafine particles 101 and the fluororesin particle 102 of 95:5 or above, the gaps in between the fluororesin particles 102 dottedly present within the silica film 104 of the coating film 103 become large, and an exposed surface portion appears having an area that allows a small-sized hydrophilic staining substance 105 such as minute dusts to stably cohere to the silica film 104, and generates a possibility that the hydrophilic staining substance 105 to cohere on the surface of the silica film 104. When the content of silica ultrafine particles 101 in the coating composition 200 is the weight ratio of the silica ultrafine particles 101 and the fluororesin particle 102 of 100:0, the effect against the hydrophobic staining substance can be expected to a small extent.

On the other hand, when the gaps in between the dottedly present fluororesin particles 102 are large, a continuous silica film 104 without being interrupted by the fluororesin particle 102 becomes wide, the hygroscopic property of the surface of the silica film 104 improves. There is an advantage of efficiently controlling an electrical charge on the surface of the coating film 103, as the electrical charge on the coating film 103 leaks easily. When the product surface is electrified, regardless of it being the hydrophilic or hydrophobic in nature, the airborne staining substances, which are the minute airborne particles, are attracted by the electrostatic force and adhered easily to the product surface.

In this coating composition 200, since the weight ratio of the silica ultrafine particle 101 and the fluororesin particle 102 is from 50:50 to 95:5, when the silica film 104 of the coating film 103 is formed from the coating composition 200 in this range, the fluororesin particles 102 will be dottedly present at an appropriate interval and the silica film 104 possess a continuous area to an extent to allow leakage of the electrical charge, thereby effectively preventing the adherence of airborne particles (the staining substances) due to the electrical charge. The stains derived from the electrostatic charge can be prevented by forming the coating film 103 on the surface by coating the product surface with the coating composition 200.

When the content of silica ultrafine particles 101 in the coating composition 200 has the weight ratio of the silica ultrafine particle 101 and the fluororesin particle 102 of 50:50 or below, the gaps in between the dottedly present fluororesin particles 102 become narrow, the antifouling performance deteriorates and an effect of restraining the electrical charge by the continuous silica film 104, and an effect of preventing the stains derived from the electrostatic charge become difficult.

Examples of the hydrophobic staining substances 106, which is an another type of staining substance, include greasy fumes, carbon, tar of cigarette, and the like. These are airborne as minute particles causing stains. Its particle diameter is 5 µm or less, mostly 0.1 to 0.3 µm, which is much smaller than the hydrophilic staining substance 105. The hydrophobic staining substance 106 is difficult to cohere on the surface portion indicating the hydrophilic property, because of the absorbed moisture or the presence of hydrophilic base on such surface. Such hydrophobic staining substance 106 coheres on the product surface by the intermolecular force generated by sticking of the hydrophobic property substance 106 with the surface portion indicating the hydrophobic property.

The fluororesin particles 102 having the average particle diameter of 50 to 500 nm as described above show the hydrophobic property in this coating composition 200. The fluororesin particles 102, in the coating film 103 formed on the product surface, due to modification or consolidation, may end up larger in size than a size of the single particle diameter. However, its size is either the same or smaller than the size of the hydrophobic staining substance 106 causing the stain. In most cases, the fluororesin particle 102 having the surface portion indicating the hydrophobic property does not provide an area where the hydrophobic staining substance 106 to stick sufficiently.

In such cases, the hydrophobic staining substance 106 cannot cohere to the fluororesin particle 102 indicating the hydrophobic property because the intermolecular force for cohering each other will not act. Naturally, the hydrophobic staining substance 106 does not cohere on the silica film 104 indicating the hydrophilic property, such that the coating film 103 produces the high antifouling performance against the hydrophobic staining substance 106.

The hydrophobic staining substances 106 do not stick sufficiently to the fluororesin particles 102 of the coating film 103 because the size (the particle diameter) of the fluororesin particle 102 described above is either equivalent or smaller than the size of the hydrophobic staining substance 106, so that the intermolecular force leading to coherence will not act. This fact alone is not enough because there is a possibility that the intermolecular force might act for partial coherence, between the hydrophobic staining substance 106 and the fluororesin particle 102. Moreover, in some cases, the hydrophobic staining substance 106 may be smaller in size than the fluororesin particle 102, and the fluororesin particle 102 might have a sufficient area where it can cohere.

However, this coating film 103 has another effect of not allowing the hydrophobic staining substance 106 to cohere on the fluororesin particle 102. This can make such a partial coherence and a coherence of the small hydrophobic staining substance 106 difficult. This effect will be described hereinbelow.

The fluororesin particles 102 of the coating composition 200, during polymerization of fluororesin, in a state of dispersion liquid to the water, and in a state of coating solution mixed with the dispersion liquid of the solid ultrafine particles, their surfaces indicate the hydrophilic property owing to the added surfactant. Once the coating film 103 is formed, the surfactant is peeled off after drying, and the surfaces of the fluororesin particles 102 indicate the hydrophobic property. However, the silica ultrafine particles 101 coexist with the fluororesin particles 102 within the coating solution, so that the surfaces of the fluororesin particles 102 of the coating film 103 formed after drying are in a state where the silica ultrafine particles 101 having a small particle diameter than the fluororesin particles 102 are sparsely adhered.

Accordingly, since the silica ultrafine particles 101 having the hydrophilic bases (i.e., indicating the hydrophilic property) are sparsely adhered on the surfaces of the fluororesin particles 102, the partial coherence of the hydrophobic property staining substance 106 does not occur on the surfaces of the fluororesin particles 102, or coherence of the hydrophobic property staining substance smaller than the fluororesin particles 102 hardly occurs. By partially introducing the hydrophilic bases to the surfaces of the fluororesin particles 102, the effect of controlling sticking of the fluororesin particle 102 with the hydrophobic property staining substance 106 can be obtained. Even if the hydrophobic staining substance 106 adheres to the surfaces of the fluororesin particles 102, since the silica ultrafine particles 101 are sparsely adhered, such adherence is unstable and peeled off easily.

On the other hand, even on the surfaces of the fluororesin particles 102 where the silica ultrafine particles 101 are sparsely adhered, a sufficient effect of the hydrophobic property is produced against the hydrophilic staining substance 105 which is by far much larger in size than the silica ultrafine particles 101. The hydrophilic staining substance 105 does not cohere on the surfaces of the fluororesin particles 102. Moreover, although the fluororesin particles 102 has a soft surface, the surfaces of the fluororesin particles 102 are hardened due to the sparsely adhered silica ultrafine particles 101, thereby obtaining the effect that the hydrophobic staining substance 106 hardly sticks.

Moreover, the fluororesin itself, as is well known in the conventional fluororesin coating to have an extremely small surface energy, and a low frictional coefficient, it not only indicates the hydrophobic property but also has an oil-repellant property. Compared with the other resins showing the hydrophobic property, it provides a characteristic that the coherence of the hydrophobic staining substance 106 hardly occurs. This is one of the effects in which the hydrophobic property staining substance 106 does not cohere on the fluororesin particle 102.

Accordingly, the coating film 103 formed by this coating composition 200 also produces the excellent antifouling performance against the hydrophobic staining substance 106.

When the content of the fluororesin particles 102 in the coating composition 200 is the weight ratio between the silica ultrafine particles 101 and the fluororesin particles 102 of 50:50 or above, the surface area of the portions offering the hydrophobic property of the fluororesin particle 102 exposed on the coating film 103 gets too large, and there is a tendency of increasing the coherence of the hydrophobic staining substance 106 on the coating film 103. Then, due to the presence of multiple numbers of the fluororesin particles 102, they may become partially consolidated, the coating film 103 becomes non-transparent, thereby impairing the tone of color of the surface of the coated product. Also, when the fluororesin particles 102 consolidate, a continuity of the silica film 104 is also impaired.

Meanwhile, when the thickness of the silica film 104 is made thicker than the particle diameter of the fluororesin particle 102, the silica film 104 having the hydrophilic property exposes over a wide area as the surface of the coating film 103, thereby deteriorating the antifouling performance against the hydrophilic property staining substance 105. Further, it impairs dispersion of the fluororesin particles 102 inside the silica film 104, the fluororesin particle 102 is educed to the surface of the silica film 104 by separating from the silica film 104, the fluororesin particles 102 consolidates with one another to form a lump to result in a local deterioration of the hydrophilic property, and the coherence of the hydrophobic staining substances 106 may occur. For this reason, as described above, the thickness of the silica film 104 is made thinner than the average particle diameter of the fluororesin particles 102, so that the fluororesin particles 102 are appropriately dispersed within the silica film 104, and each fluororesin particle 102 is exposed partially (not totally) from the silica film 104.

Examples of the fluororesin particle 102 used in this coating composition 200 include: PTFE (poly-tetrafluoroethylene), FEP (tetra-fluoro-ethylene and hexa-fluoro-propylene copolymer), PFA (tetra-fluoro-ethylene-perfluoro-alkylvinyl-ether copolymer), ETFE (ethylene tetrafluoroethylene copolymer), ECTFE (ethylene chlorotrifluoroethylene copolymer), PVDF (poly vinylindene), PCTFE (poly-chloro trifluoro ethylene), and PVF (poly-vinyl-formale), and their copolymers or mixtures, or other resins mixed therein.

Prior to manufacturing of the coating composition 200, the fluororesin particle 102 must be dispersed in water, in the phase of the dispersion liquid. The method of dispersion is achieved by using the fluororesin particle 102 polymerized by suspension polymerization and emulsion polymerization, and utilizing the surfactant. In the state of being dispersed in the water, the hydrophobic property of the surface of the fluororesin particle 102 is low. When the surface is dried and solidified (the coating film 103), ideally, the surface indicates the hydrophobic property. As the fluororesins being used, especially PTFE and FEP are preferred in terms of excellence in stability of not agglomerating in the dispersion liquid or coating solution. These are also preferred in terms of a high grade of hydrophobic property of the coating film 103 formed after drying.

As described above, the coating film 103 formed on the product surface using this coating composition 200 coheres neither the hydrophilic staining substance 105 nor the hydrophobic staining substance 106, and even if these are adhered, they can be removed easily. It can produce the excellent antifouling performance and the peeling off property, and prevents staining of the coated filter surface. The practical examples which will be described later (the experimental results) verify that the antifouling performance of the coating composition 200 of the present embodiment as excellent.

A manufacturing method of the coating composition 200 of the present embodiment is not particularly limited. The coating composition 200 can readily be manufactured by mixing the dispersion liquid of the silica ultrafine particles 101 and the dispersion liquid of the fluororesin particles 102. Herein, as the dispersion liquid of the silica ultrafine particles 101 in use, the dispersion liquid that disperses the silica ultrafine particles 101 having the average particle diameter of not more than 15 nm, for example, there is a colloidal silica available on the market. In the dispersion liquid of the silica ultrafine particles 101, its volume ratio of the silica ultrafine particle 101 within the dispersion liquid is preferably 20% or less. This is because the stability of the dispersion liquid deteriorates to cause agglomeration of the silica ultrafine particles 101, when the volume ratio exceeds 20%.

As the dispersion liquid of the fluororesin particles 102 in use, the dispersion liquid that disperses the fluororesin particles 102 having the average particle diameter of not more than 500 nm, for example, there is a PTFE dispersion. The surfactant, in order to uniformly disperse the fluororesin particles 102 having the hydrophobic property without agglomeration, may be added to the coating composition 200. For both of the dispersion liquids, a polar solvent is not limited to the water.

The water being used in each dispersion liquid is not particularly limited. In order for the silica ultrafine particles 101 and the fluororesin particles 102 to stably disperse therein without agglomeration, that having less ionic impurities such as calcium ion and magnesium ion are preferred. The divalent (or more) ionic impurities are ideally 200 ppm or less, more preferably 50 ppm or less. When the divalent (or more) ionic impurities increase, the silica ultrafine particles 101 and the fluororesin particle 102 agglomerate and settle, and the strength and the transparency of the coating film 103 formed deteriorates.

The coating composition 200 does not include an organic solvent, and it is safe and kind to the environment. Because the coating composition 200 is manufactured simply by mixing the dispersion liquids available on the market, it can be manufactured readily at a low cost, which is an advantage.

The surfactant or the organic solvent may be added to the coating composition 200, depending on the stability of the fluororesin particle 102 having the hydrophobic property and a material of the coating product, based on the notion of attempting adjustment of the hydrophilic property of the coating film 103 and improvement in a firmly adhesive property of the coating film 103 formed. Also, a coupling agent or silane compound may be added to the coating composition 200, for the purposes of improving the firmly adhesive property, the transparency, and the strength of the coating film 103 formed, and adjusting the hydrophilic property of the coating film 103.

Herein, the surfactants usable in the coating composition 200 include various anion or nonionic surfactants. Among them, polyoxypropylene-polyoxyethylene block copolymer or poly carboxylic acid type anionic surfactant are preferable because of their low foaming property allowing for easy use.

Also, examples of the organic solvents usable in the coating composition 200 include various alcohols, glycols, esters, ethers, and so forth on.

Also, examples of the coupling agents usable in the coating composition 200 include amine group such as 3-(2-aminoethyl)aminopropyl trimethoxysilane, epoxy group such as 3-glycidoxypropyl trimethoxysilane, methacryloxy group or mercapto group such as 3-methacryloxypropyl methyl dimethoxy silane, sulfide group, vinyl group, ureido group, and so forth on.

Also, examples of the silane compounds usable in the coating composition 200 include halogen containing substance such as trifluoropropyl trimethoxysilane and methyltrichlorosilane, alkyl group containing substance such as dimethyldimethoxysilane and methyl trimethoxysilane, silazane compound such as 1,1,1,3,3,3-hexamethyldisilazane, and oligomer such as methyl methoxy siloxanes.

Amounts of these additives are not particularly limited. They can be appropriately adjusted depending on the selected additive, as long as they do not impair the antifouling performance, the initial hydrophilic property, and the firmly adhesive property and the durability of a long-term hydrophilic property of the coating composition 200.

A method of coating the product surface with the coating composition 200 of the present embodiment is not particularly limited, and a well-known conventional method may be used. Ideally, after the coating composition 200 is coated onto the coating product surface by immersion, spraying, or showing, an excessive coating composition 200 on the surface is removed by using the air jet. When the excessive coating composition 200 remains on the product surface, the coating film 103 formed on that portion becomes thick and non-transparent, thereby impairing the tone or color of the coating product. As an advantage of using the air jet, the drying process is effectively promoted, and an ideal coating film 103 having the fluororesin particles 102 appropriately present in dots within the silica film 104 is obtained. However, when a base is a resin having a high water-repellant property, the coating liquid is blown away when a strong air jet is used, so that the coating should be firmly attached by drying with a weak air jet or rack drying.

Figure 6:
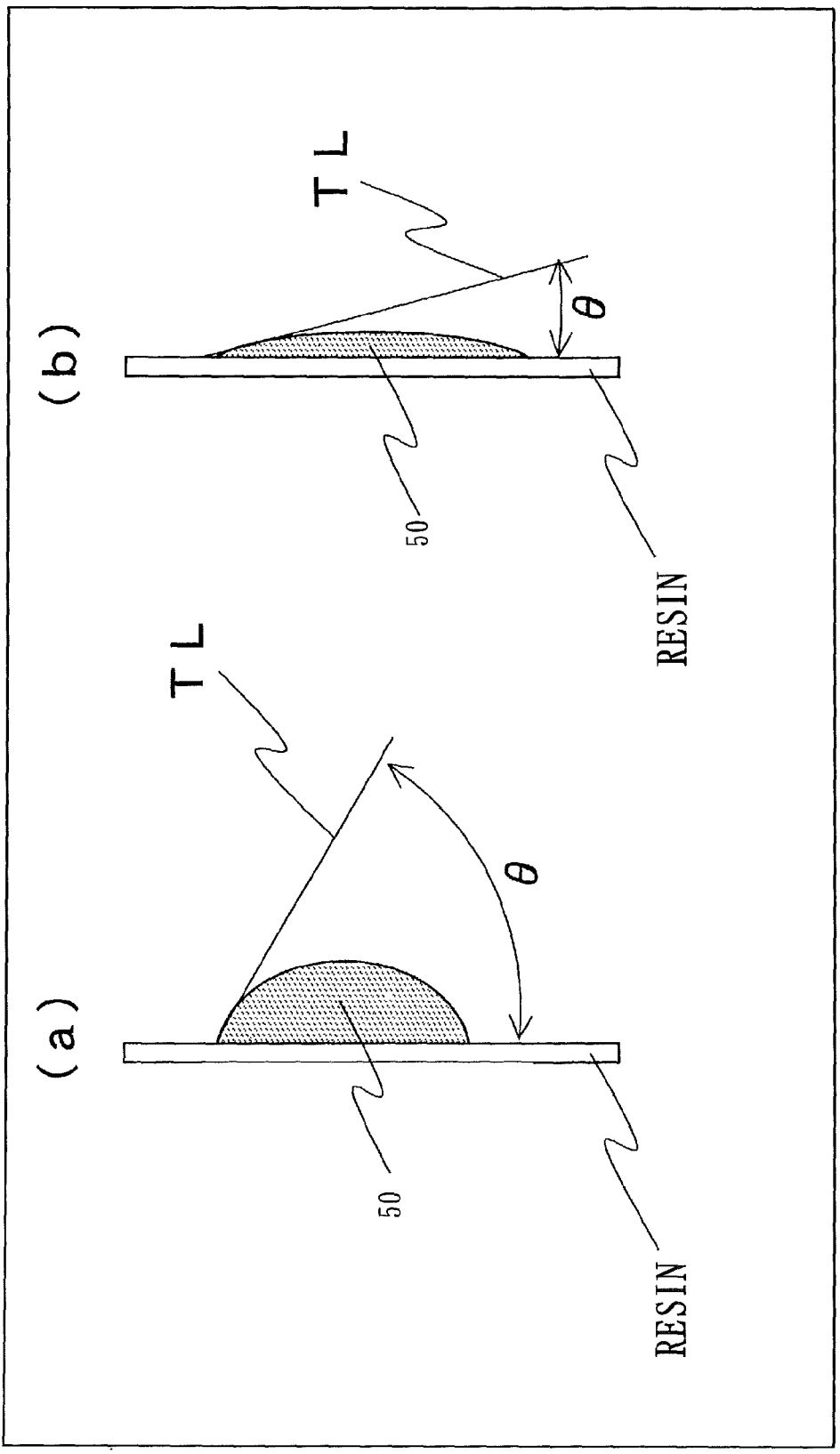
FIG. 6 is a schematic view for describing contact angles θ of droplets adhered to the resinous surface (a) and (b), in accordance with the embodiment 1.

The antifouling performance of the coating composition 200 that disperses the fluororesin particles 102, having the silica ultrafine particles 101 film as the base, has been described so far. Hereinbelow, restraining of the droplet enlargement by the high hydrophilic property and a drying speed will be described. FIG. 6 is a schematic view for describing contact angles θ of droplets adhered to the resinous surface (a) and (b), in accordance with the embodiment 1.

Herein, the contact angle θ is the angle at which a tangential line TL meets the resin surface, at a portion of contact of the resin surface and the droplet 50 adhered to the resin surface. The smaller the contact angle θ, that is, as it approaches 0 degrees, the droplet 50 adhered to the resin surface flattens and spreads easily, and the droplet does not enlarge and dries up quickly. By a high hydrophilic property is meant that the adhered droplet 50 spreads easily. That is, the smaller the contact angle θ (as it approaches 0 degrees), the greater the hydrophilic property, in other words, the hydrophilic property is excellent. Referring to FIG. 6, the droplet 50 shown in (a) has a smaller contact angle θ than that of the droplet 50 shown in (b).

Examples of a general-purpose organic resin used in the coating products of the air conditioner, such as the casing unit 15, the right and left flaps 16, the upper flap 16, and the lower flap 17, include PS (polystyrene), ABS (acrylonitrile-butadiene-styrene), and PP (polypropyrene) The contact angles of these resins are at least 50 degrees or more, in general, around about 80 degrees, having water-repellant faces. Since the contact angle θ is large, a duration of the droplet 50 existing as a droplet becomes long, and the droplet grows large when more moisture adheres, and eventually it falls down. In the worst case, the droplets splash into the user's room from the indoor unit of the air conditioner. Also, a rate of the mold growth increases when the droplet retention time is long, and the black mold and blue mold will cover the entire resin-made components by using the surrounding stains or air as a medium for the mold growth.

Although the coated product 107 (the coating resin) that has been coated with the coating composition 200 of the present embodiment, microscopically, it provides both factors of the hydrophilic property and the hydrophobic property, however, it shows the high hydrophilic property as a whole, owing to the effect of continuously linked silica, and the exposed area of the silica film 104 is greater than the exposed area of the fluororesin particles 102. This is because the fluororesin particles 102 partially exposed from the surface of the silica film 104 are present in dots within the silica film 104 having the high hydrophilic property and comprising the silica ultrafine particles 101, as the base. The specific measurement of a static contact angle shows 10 to 20 degrees approximately, indicating the high hydrophilic property. Therefore, compared with the conventional resin which is not coated with the coating composition 200, that has the contact angle of around 80 degrees, it restrains the droplet enlargement by preventing splashing and spreading the droplets which will improve the drying speed, because the surface area that comes into contact with the air increases from the spreading. Accordingly, the mold growth can be restrained because the moisture exists on the resin surface only for a short time.

Since extremely small silica ultrafine particles 101 of 4 to 15 nm are continuously linked, compared with other organic hydrophilic coatings, such as acryl, poly ether, and polyvinyl alcohol, for example, the droplet 50 collapses and spreads in a short time by 2 digits. The coating that uses the fluororesin particle 102 dispersed with the silica ultrafine particle 101 can provide an extremely high hydrophilic property, at the same time, has an extremely high antifouling performance against both the hydrophilic and the hydrophobic staining substances, thereby effectively restraining the dew splashing and the mold growth.

The hydrophilic property of the coating composition 200 that disperses the fluororesin particles 102 within the silica ultrafine particles 101 film as the base has been described so far. Hereinbelow, the firmly adhesive property with the base, the organic resin, will be described. As described previously, the general-purpose organic resins such as PS (polystyrene), ABS (acrylonitrile-butadiene-styrene), and PP (polypropyrene) are used to form the coating products of the air conditioner 100, such as the casing unit 15, the right and left flaps 13, the upper flap 16, and the lower flap 17. Also, AGS (glass reinforced acrylonitrile-styrene) is used to form the ventilation fan 20.

The coating composition 200 that can reconcile the hydrophilic property and the antifouling property is a safe coating because the organic solvent is not being used. Since the coating composition 200 has a non-organic constituent such that it would show a good firmly adhesive property to a metallic material, on the other hand, the firmly adhesive property to the organic resin is not that good. Also, these resins have water-repellant faces, therefore, a water-based coating itself does not adhere at all. Accordingly, even if a water-based organic dispersion coating solution is applied on the organic resin which is the portion to be coated, the film may not adhere partially, or it may be peeled off naturally after a long-term use. Also, it may be peeled off easily upon cleaning and wiping.

Conventionally, various measures have been adopted for improving the firmly adhesive property of the coating. For instance, there are methods of implementing corona processing and UV processing to the product surface in advance as pre-treatments. The resin surface improves from these pre-treatments, and the firmly adhesive property improves even if the coating material of a poor affinity is being used.

Figure 7:
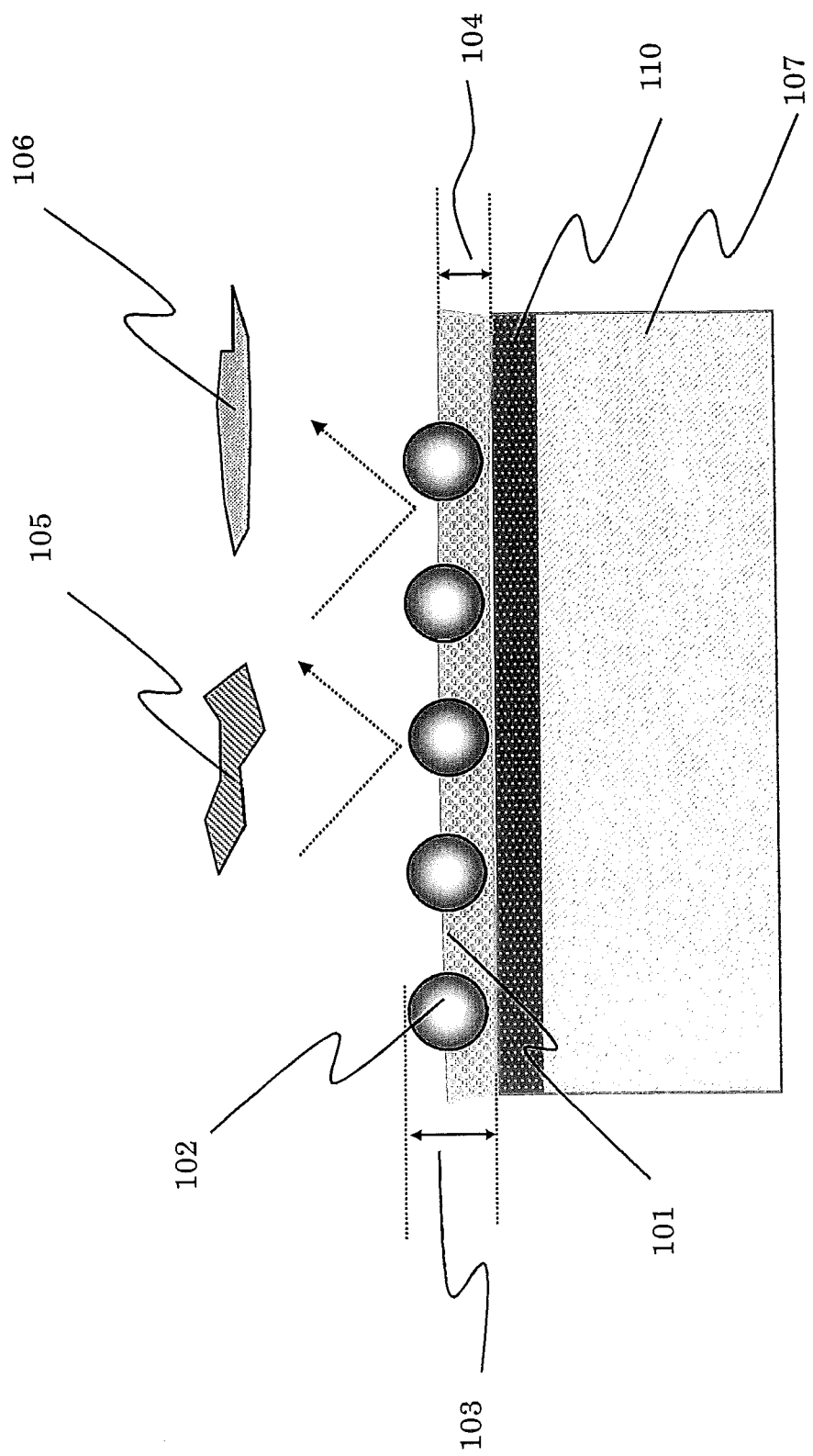
FIG. 7 is a conceptual drawing showing the sectional view of the conventional coating using a primer treatment for comparison.

FIG. 7 shows the conventional coating that employs the primer processing. A primer layer 110 is an undercoating that serves as a bonding agent, and is applied on the surface of the coated product 107 (the coating resin) in advance, and the coating of the present embodiment is applied on top of it. This is the two-step coating method. As the primer layer 110, for example, a polyolefin layer may preferably be used. The primer layer 110 improves the firmly adhesive property and a flattening property.

When the corona processing, the UV processing, and the two layer primer processing are performed, in which case there were problems such as a large-scale facility requirement, a long processing time, and an elevated cost. These processing are not suited to the product for mass production such as the air conditioner 100. Thus, in the present embodiment, as a simple low-cost method suitable for the mass production, we have added minute amounts of radical generator 111 and peroxide compound 112 to the coating solution.

Herein, the radical generator 111 is defined as a material which is generally used in a radical polymerization linking the molecules, and which shows a breaking down effect by heating at a temperature of 60° C. or more. The radical polymerization can be thought of as one form of polymerization reaction in the high molecular science, which is a polymer chain extending reaction, with a radical as the reaction center. The radical generator 111 includes BPO (benzoyl peroxide; oil soluble), AIBN (azoisobutyronitrile), AVCA (4,4-azobis (4-cyanovleric acid)), and the like. For instance, as an example of the radical polymerization, there is a polyethyrene generation by ethyrene polymerization. A reaction for generating a free radical which serves as an initiator of the radical polymerization, the radical is generated by breaking down BPO or AIBN by lighting or heating, by removing the oxygen, and by breaking the double bond, as shown in the subsequent equations.

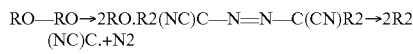
$$RO\text{—}RO \rightarrow 2RO.R2(NC)C\text{—}N\text{=}N\text{—}C(CN)R2 \rightarrow 2R2(NC)C.+N2$$

The peroxide compound 112, an abbreviation or another name for the following compounds, is defined as being water-soluble and has a self-degradation effect at the room temperature. Normally, the peroxide compound 112 is used as an oxidizing agent or bleaching agent, and it is not used for coating purposes. Among inorganic compounds, mainly, the peroxide compound 112 refers to an inorganic peroxide compound 112 having a chemical formula of a metal salt of the hydrogen peroxide as standard, or refers to a substance having a structure that replaces a hydroxyl group of oxoacid (—OH) with a hydroperoxide group (—O—OH). Among organic compounds, mainly, the peroxide compound 112 refers to a compound having a peroxide structure (—O—O—) as the functional group, and a compound having a percarboxylic acid structure (—C(=O)—O—O—) as the functional group. The hydrogen peroxide is most frequently used.

Intrinsically, the radical generator 111 is a material that polymerizes a single molecule, whereas the peroxide compound 112 is a material used as the oxidizing agent or the bleaching agent. We have found that the firmly adhesive property between the general-purpose organic resin such as PS (polystyrene), PP (polypropyrene), ABS (acrylonitrile-butadiene-styrene), and ASG (glass reinforced acrylonitrile-styrene) with the inorganic coating composition 200 formed by using silica ultrafine particles 101 film and the dispersion liquid of the fluororesin particle 102 as the raw materials improves by selecting an appropriate radical generator 111 or peroxide compound 112 that cope with the resinous base.

Figure 8:
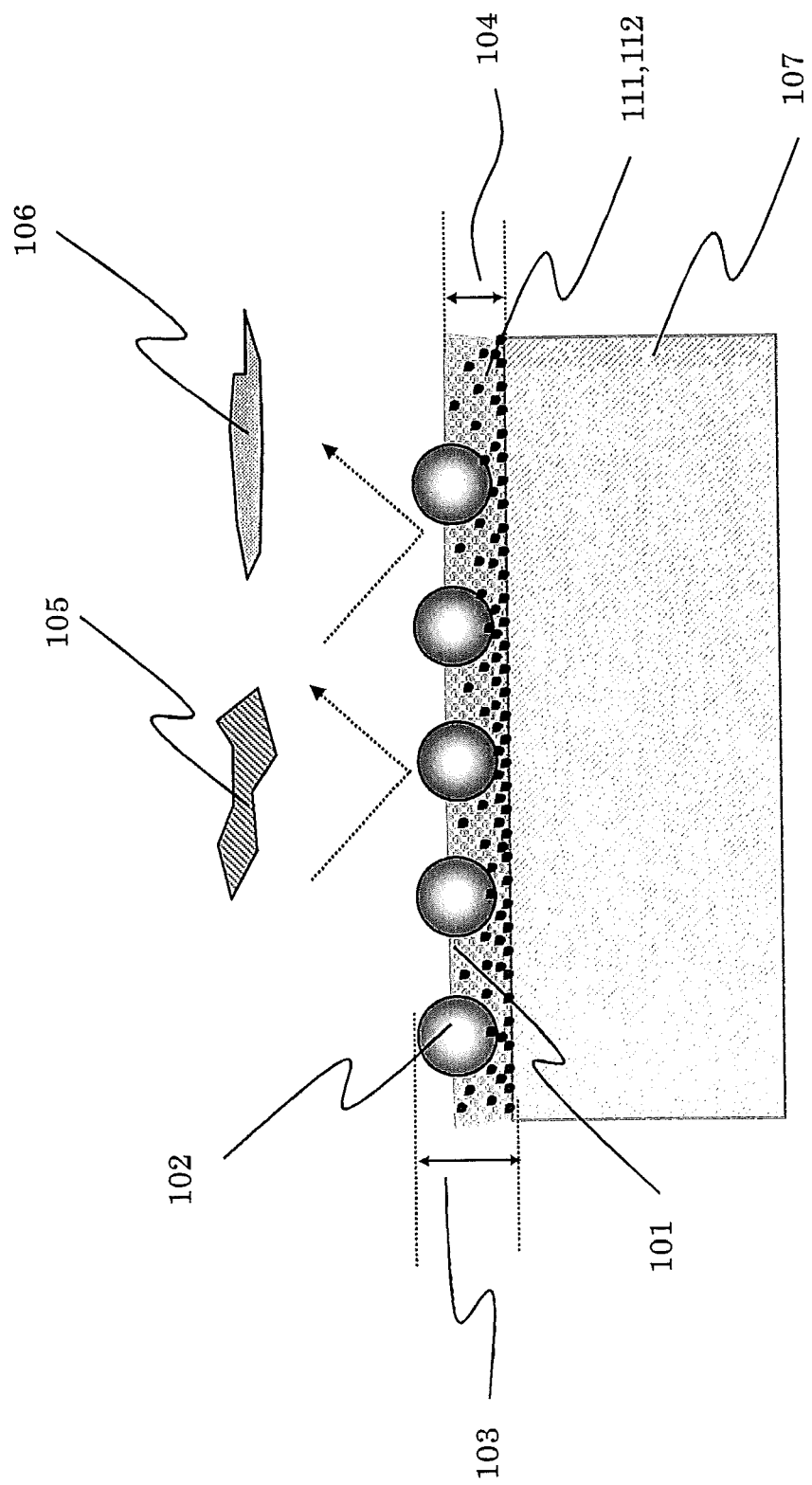
FIG. 8 is a conceptual drawing showing the sectional view of the coating film 103 formed by coating the coating composition 200 comprising the radical generator 111 and the peroxide compound 112 to a resinous surface, in accordance with the embodiment 1.

FIG. 8 shows the coating of the embodiment 1 that has added the radical generator 111 or the peroxide compound 112. As can be seen in this drawing, the radical generator 111 or the peroxide compound 112 are being dispersed within the coating film 103. By adding a minute amount of the radical generator 111 or the peroxide compound 112 into the coating solution, it becomes easy to apply the coating solution on the resin having the high water-repellant property because the coating solution does not repel therefrom. As the radical generator 111 or the peroxide compound 112 breaks down by heat or undergoes self-degradation with time, the monomer component or surfactant included in the fluororesin dispersion liquid (called the dispersion liquid) acts as an origin of reaction, and influences a morphological change in silica agglomeration and an adhesion effect of the coated product 107 (the coating resin) base and the silica film 104, thereby improving the firmly adhesive property, especially at a vicinity of the interface of the coated product 107 (the coating resin) and the silica film 104. These does not take place without one of the resinous dispersion liquid or the reaction materials (the radical generator 111 or the peroxide compound 112).

When ABS or ASG is used as the base, the firmly adhesive property improves by adding BPO, the thermal radical having a poor water solubility. Being a thermal radical, the firmly adhesive property is effectively improved further by applying heat of 60 degrees or more, but still the improved effect can be obtained by leaving it at the room temperature. It was observed that the amount of additive BPO is preferably 0.05% to 5% of the total coating solution as effective. When PS or PP is used, the firmly adhesive property improves by adding the water-soluble peroxide compound 112, such as the ammonium persulfate (APS), sodium persulfate, or hydrogen peroxide. Being a peroxide compound 112, the firmly adhesive property is effectively improved further by applying heat of 60 degrees or more for effective degradation, but still the improved self-degradation effect can be obtained at the room temperature. It was observed that the amount of additive peroxide compound 112 is preferably 0.05% to 5% of the total coating solution as effective. The radical generator 111 or the peroxide compound 112 disintegrates and vanishes by heat and with time, causes reaction to the surrounding object, and influences separation/degeneration. The detail will be described in the later practical examples.

The large-scale facility for the corona processing or the UV processing or the primer two layer processing (adhesive layer) is not required by using the radical generator 111 or the peroxide compound 112. Also, since a single layer coating is enough, and a plural coating steps are no longer required, and the organic coating composition 200 can be applied over the organic resin easily, making it capable of forming the coating which is low in cost, with an increased firmly adhesive property, and that hardly peels off.

The coating composition 200 of the present embodiment is applicable to, but not limited to, the casing unit 15, the right and left flaps 13, the upper flap 16, the lower flap 17, and the nozzle 18 of the air conditioner 100, to which their surfaces are coated by the coating film 103. The coating composition 200 of the present embodiment can be used to cover surfaces of various products. Application to the product is not particularly limited, for example, various products where there are danger of various stains (the hydrophilic staining substance 105 or the hydrophobic staining substance 106) such as powders, dusts, greasy fumes, tar of cigarette, cohere, irrespective of the product being used at indoor or outdoor, because the antifouling performance is excellent.

In addition, it has an excellent initial hydrophilic property and a long-term endurance of the hydrophilic property, such that there is an advantage in applying to products subjected to water, such as those comes in contact with water on daily basis, those that scoops water, those that are exposed to water, and those that discharges water adhered on the surface. Not only it can provide the antifouling effect, but also can obtain the effects of increased hydrophilic property and discharging property. Specific examples include: a hair dryer for repelling water attached on hands, a disk type humidifier that scoops accumulated water by a plate, a kitchen ventilation fan that sucks in streams and greasy fumes, a toilet seat, an exterior paint or side mirror of automobile, a window glass of the automobile and building, a mirror in the bathroom, a guard mirror, a roof or external wall of the building, a dish or kitchen appliances, and a toiletry.

Examples of the resins used as the base include, but not limited to, PS (polystyrene), PP (polypropyrene), ABS (acrylonitrile-butadiene-styrene), and ASG (glass reinforced acrylonitrile-styrene). Examples of the additive radical generator 111 includes, but not limited to, BPO. Examples of the additive peroxide compound 112 include, but not limited to, ammonium persulfate (APS), sodium persulfate, and hydrogen peroxide. The long-term firmly adhesive property is increased by adding of the radical generator 111 and the peroxide compound 112, the method of which is useful in applying the nonorganic compound coating over the resin constituted from various organic compound. Acting in conjunction with the firmly adhesive property, the hydrophilic property and the antifouling property are obtained by implementing the coating of the present embodiment.

PRACTICAL EXAMPLES

Hereinbelow, the detailed experimental results and characteristics of the antifouling property, the hydrophilic property, and the firmly adhesive property of the coating composition 200 of the present embodiment are illustrated by way of the specific embodiments. The following practical examples do not limit the scope of the present embodiment. PS (polystyrene) and ABS (acrylonitrile-butadiene-styrene) that are generally used as the materials forming the casing unit 15, the right and left flaps 13 and 16 are used as the target of the experiment for forming the coating film 103 to their surfaces.

Practical Examples 1 to 7

In the practical examples 1 to 7, the coating compositions having the compositions shown in FIG. 9 are prepared by agitating and mixing the colloidal silica (manufactured by Catalysts and Chemicals Co. Ltd, PH=10) that disperses silica ultrafine particles 101 having the average particle diameter of 9 nm in the distilled water, with the PTFE dispersion (manufactured by Asahi Glass Co. Ltd, pH=10) that disperses the fluororesin particles 102 having the average diameter of 250 nm in the distilled water, then a non-ionic surfactant (polyoxylethylene alkyl ether) is further added for more agitation and mixing. Amount of the non-ionic surfactant within the coating composition is found to be 0.05% by weight. Surfaces of the test pieces are coated with these coating compositions. Also, in order to find the optimal weight ratio of the silica ultrafine particles 101 and the fluororesin particles 102, the weight ratios of the silica ultrafine particle 101 and the fluororesin particle 102 are changed within a range of 30:70 to 100:0.

Comparative Examples 1 to 3

In the comparative example 1, a non-coated PS resin, being used in the air conditioner heretofore in use, does not contain silica or fluorine. In the comparative example 2, an organic PVC (polyvinyl alcohol)-coated PS resin, commonly used as a hydrophilic paint, being used in the air conditioner heretofore in use, does not contain silica or fluorine. In the comparative example 3, the coating composition 200 is prepared by increasing the weight ratio of the silica ultrafine particles 101 while having the same weight ratio as the practical example 6, in other words, the coating composition 200 is prepared by increasing the concentrations of the particles. FIG. 9 shows the detail.

The coating composition 200 of each example is applied onto a test piece to form a coating film 103 on the test piece by rack drying. A characteristic, an initial contact angle θ, and an antifouling performance are evaluated for each coating film 103. In each example, the characteristic of coating film 103 is evaluated by visual observation. The contact angle θ is measured by the contact angle meter (DM100 manufactured by Kyowa Interface Science Co. Ltd.). The antifouling performance evaluates a coherence property of the hydrophilic staining substance 105, such as sands and dusts, and a coherence property of the hydrophobic staining substance 106, such as carbon powder dusts.

The coherence property of the hydrophilic staining substance 105 is evaluated in five levels by visually observing a color formation due to the coherence of red-colored Kwanto loam dusts having a mean center diameter of 1 to 3 μm which are air blown onto the coated surface (the coating film 103). In this evaluation, no coherence of the Kwanto loam dusts is evaluated as level 1, and much coherence of the Kwanto loam dusts is evaluated as level 5. Likewise, the evaluation for coherence property of hydrophobic staining substance 106 is evaluated in five levels by visually observing a color formation due to a coherence of oil-based black carbon black which are blown onto the coated surface (the coating film 103). In this evaluation, no coherence of the carbon black is evaluated as level 1, and much coherence of the carbon black is evaluated as level 5. The evaluated results are shown in FIG. 10.

According to the experimental results shown in FIG. 10, the coating films 103 formed by the coating compositions 200 of the practical examples 1 to 7, show the excellent antifouling performance against both the hydrophilic and hydrophobic staining substances, and macroscopic characteristics of the coating film 103 formed (the hydrophilic property or hydrophobic property) can be adjusted by preparing the contents (the weight ratio) of the silica ultrafine particles 101 and the fluororesin particles 102.

Since a "continuously-linked" hydrophilic silica film 104 is the base of the coating film 103 of the present embodiment, by and large, the contact angle shows a low value, however, microscopically, the hydrophilic property and the hydrophobic property are alternately arranged by linking continuously at a nano level. Moreover, the adherence of the hydrophobic staining substance 106 can be restrained when the proportion of silica increases. The adherence of the hydrophilic staining substance 105 can be restrained when the proportion of fluorine increases.

However, the antifouling performance against the hydrophobic staining substance 106 tends to deteriorate slightly in the practical example 1 where the weight ratio of the fluororesin particle 102 is high (the weight of silica ultrafine particle 101 and the weight of fluororesin particle 102 is 30:70). Also, in the embodiment 7 where the film is formed only from the silica ultrafine particles 101 (the weight of silica ultrafine particle 101 and the weight of fluororesin particle 102 is 100:0), the antifouling effect is quite limited as a whole because a minute unevenness is not formed without the fluororesin particles 102 so that the adhering area becomes large.

The coating films 103 having a thin and uniform thickness is formed from the coating compositions 200 of the practical examples 1 to 7. The thickness of the coating observed from the electron microscopic image indicates a thin film of about 100 nm, thereby forming a transparent film. Comparing the embodiment 6 with the comparative example 3, one can see that the film characteristic changes even if the weight ratio of the silica ultrafine particle 101 and the fluororesin particle 102 is the same. When the content of the silica ultrafine particle 101 (the concentration) is increased (exceeding 5% by weight), the thickness of the coating film 103 becomes uneven, the coating film 103 becomes non-transparent, and the coating film 103 is liable to a crack formation.

To cope with the antifouling performance against both the hydrophilic and hydrophobic properties of the staining substances, the preferred weight ratio of the silica ultrafine particle 101 and the fluororesin particle 102 is ranging from 50:50 to 85:15, as in the practical examples 2, 3, 4 and 5. In more detail, the weight ratio is 75:25 of the embodiment 4 is most preferable. In the practical example 4, the coated product 107 (the coating resin) is effectively prevented from stains by both particles having hydrophilic and hydrophobic properties. Control of the antifouling property is facilitated by adjusting the content (the weight ratio) of the silica ultrafine particles 101 and the fluororesin particles 102.

On the other hand, the non-coated PS resin being conventionally used in the air conditioner of the comparative example 1 apparently adheres both stains to become contaminated easily. Evaluation based on a light transmittance is performed separately by blowing Kwanto loam sands and dusts and carbon black powders onto a PET film where the light passes through, for the purpose of measuring an absolute value of the antifouling effect. As a result of this, the practical example 4 (the weight ratio of the silica ultrafine particles 101 and fluororesin particles 102 is 75:25), in comparison to the comparative example 1, the conventional non-coated PS resin, the amount of adherence for both the hydrophilic and hydrophobic properties can be controlled to an extent of about $1/10$ to $1/20$. Moreover, compared with the comparative example 2 that has applied the PVC coating, a typical hydrophilic paint, the amount of adherence for both the hydrophilic and hydrophobic properties can be controlled to an extent of about $1/5$ to $1/10$.

In addition, a surface resistance of the PS resin (the volume resistivity) of the comparative example 1 shows a high value of $10^{16}$ $\Omega\cdot$cm. In contrast, surface resistances of the coatings of the practical examples 1 to 7 show a low value of $10^{12}$ $\Omega\cdot$cm, such that their surface electrostatic forces become lower than the conventional non-coated PS resin, and the adhered stain is easily peeled off by that amount. This is owing to the fact that the coating of the present embodiment shows the hydrophilic property macroscopically and that the electricity readily flows through by urging the ion conduction from the OH bases present on the surface.

Black carbon, representing the hydrophobic property particle, is used. An influence of the greasy fume, which is another hydrophobic property substance, is confirmed. Allow the greasy fume generated from a grilled meat and the distributed fibrous dusts of 0.1 to 1 mm, to pass through the coating resin of practical example 4 and the conventional non-coated PS resin of the comparative example 1, by placing them in a 20 cm square wind-tunnel, and by setting a frontal face velocity of 1 m/s of the coated product 107 (the coating resin). An extent of the adherence of greasy fumes and the fibrous dusts is observed visually and under a microscope. As a result of this, the amount of adherence of the dusts is clearly small in the practical example 4, indicating that the adherence of greasy fume is controlled. Even though the greasy fume adheres, because the adherence area of the hydrophobic particle is less and the film is low in density, the greasy fume will be absorbed by an interior of the coating, so that the greasy fume will not remain on the surface. Moreover, peeling off of the dusts and sands after elapse of time is confirmed. On the other hand, in the comparative examples 1 to 3, the adherence of greasy fume on the surfaces were apparently confirmed, and the dusts peel off hardly even after elapse of time.

Hereinbelow, the hydrophilic property will be described. In reference to FIG. 10, the non-coated PS resin, shown in the comparative example 1, has the static contact angle of 80 degrees. The coated PS resins, shown in the practical examples 3 to 7, have the static contact angles of 10 to 20 degrees. When the contact angle is low, a droplet spreads, restrains enlargement and fallout of the droplet, and the droplet dries up quickly. It is a well-known fact that drying of the moisture follows a contact area rule (=surface area of the droplet), provided the same ambient air temperature and the air speed. The contact area of moisture and air on the coating surface having the hydrophilic property increases to facilitate drying.

Practically, a 20 μL droplet is dropped onto the horizontally-placed test piece, and the a droplet smashes and spreads instantaneously on the coated PS resin of the practical example 4. However, a droplet did not smash on the non-coated PS resin of the comparative example 1, because of its water-repelling property. Further, for comparing with another hydrophilic coating, a similar test was carried out by using a generally used PVC (polyvinyl alcohol)-coated PS resin of the comparative example 2, and we have found that the time taken until the droplet smashes and spreads was long. FIG. 11 shows photographs of this behavior taken by the high-speed camera. When a time taken for the fallen droplet to smash and flatten to reach the initial contact angle θ is measured, the PVC-coated resin of the comparative example 2 takes about 1 second, the PVC-coated PS resin of the practical example 4 takes 0.01 second which is faster by 2 digits, which has shown the ideal hydrophilic property where the adhered droplet instantaneously spreads. Needless to say, compared with the PVC-coated resins and the resins that are not hydrophilic, the coating of the present embodiment utilizing the silica ultrafine particles 101 restrains the moisture enlargement, and effective in restraining the droplet fallout.

Figure 12:
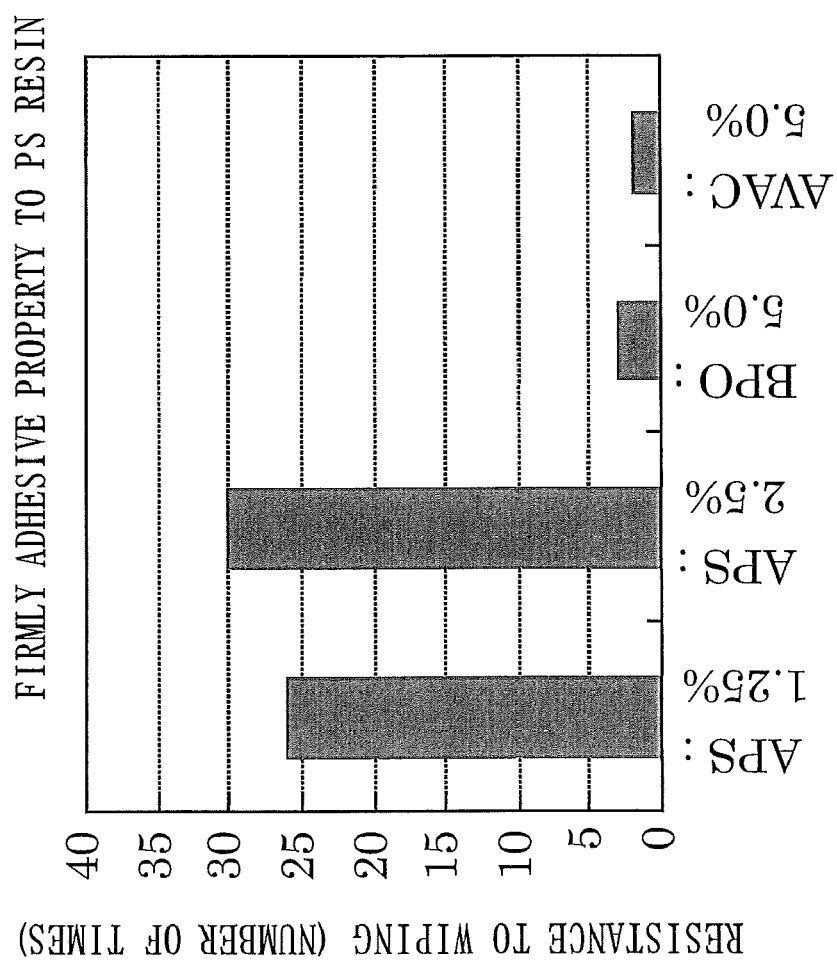
FIG. 12 illustrates a number of times the coated product 107 comprising the radical generator 111 and the peroxide compound 112 is resistant to wiping, in accordance with the embodiment 1.
Figure 13:
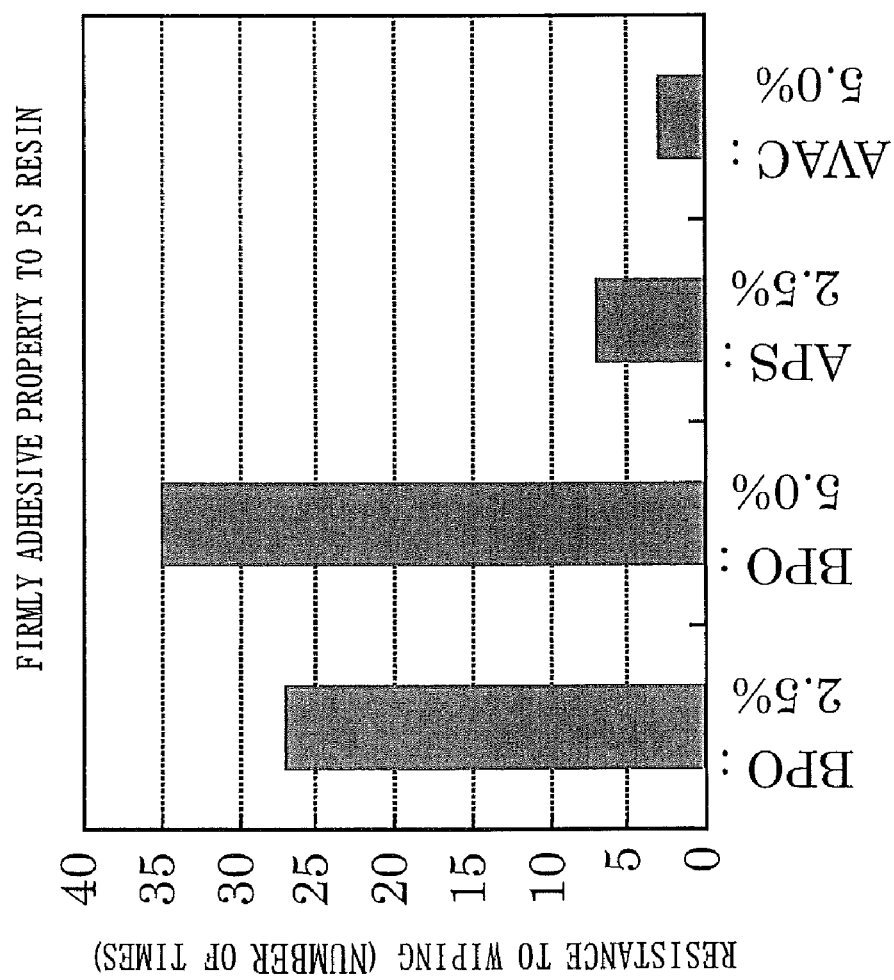
FIG. 13 illustrates a number of times the coated product 107 comprising the radical generator 111 and the peroxide compound 112 is resistant to wiping, in accordance with the embodiment 1.

Hereinbelow, the firmly adhesive property will be described. Evaluation of the firmly adhesive property is carried out by applying a pressure in reciprocating motion at approximately 1 kg/cm$^2$, with a wet tissue paper, to the test piece formed, and a number of times taken before peeling off is evaluated. 1 kg/cm$^2$ is equivalent to a pressure applied upon strongly rubbing with an eraser. Blended solution of the practical example 4 that added the peroxide compound 112 or the radical generator 111 is used as the coating solution, and after the coating is applied, it is dried under an environment of 60 degrees for 18 hours. As the radical generator 111, BPO (benzoyl peroxide), or AVCA (4,4-Azobis(4-cyanovaleric acid)) is used. As the peroxide compound 112, ammonium persulfate (APS), sodium persulfate, or hydrogen peroxide is used. FIG. 12 illustrates a firmly adhesive property of a certain coating substance 7 (the coating resin) against a PS resin (polystyrene). FIG. 13 illustrates a firmly adhesive property against ABS resin (acrylonitrile butadiene styrene).

As a result, when the coated product 107 (the coating resin) as the base is made from the PS resin (polystyrene), the effectiveness of the thermal radicals, AVAC and BPO, were small. For those that added the peroxide compound 112, such as ammonium persulfate (APS), to a concentration of the coating solution, they have shown a resistance to wiping (number of times) of 10 times or more. Although not illustrated in the drawing, similar tendency as in the PS resin is seen for the PP resin (polypyrene) used as the base. Moreover, the improved effect in the firmly adhesive property is also observed for the cases of adding sodium persulfate and hydrogen peroxide. The effect is confirmed at the added concentration of 0.05% to 5%.

Moreover, when the base is ABS resin (acrylonitrile butadiene styrene), the effectiveness of the peroxide substance 112, such as ammonium persulfate (APS), is small. For AVCA, the homogeneity is not observed, and the firmly adhesive property has deteriorated. For those that added BPO, which is a non-aqueous thermal radical, they have shown the resistance to wiping (number of times) 5 to 7 times more.

After the coating, it is most effective under the environment of 60° C. for 18 hours, however, 3 times greater improvement in the firmly adhesive property is recognized even if leave it standing for 18 hours at the room temperature of 20° C. By adding the radical generator 111 and the peroxide compound 112 to the coating solution, the coating does not repel and easily applied even on the resin having the high water-repellant property. As the radical generator 111 or the peroxide compound 112 breaks down by heat or undergoes self-degradation with time, the monomer component or surfactant included in the fluorores in dispersion liquid (called dispersion liquid) acts as the origin of reaction, and influences a morphological change in silica agglomeration and an adhesion effect of the coated product 107 (the coating resin) base and the silica film 104, thereby improving the firmly adhesive property, especially at a vicinity of the interface of the coated product 107 (the coating resin) and the silica film 104. These do not take place without one of the resinous dispersion liquid or the reaction materials (the radical generator 111 or the peroxide compound 112). Taking this fact into account, we can conclude that the constituents of the resin dispersion liquid and the reaction materials are contributing to the effect.

As described above, the air conditioner 100 of the present embodiment is characterized in that the coating composition 200 formed on the surfaces of resin-made components where the dew formation occurs upon the cooling operation of the air conditioner 100, includes the silica ultrafine particles 101 and the fluororesin particles 102, and provides, within the coating film 103 a silica film 104 comprising the silica ultrafine particles 101 and the fluororesin particles 102 partially exposed from the surface of the silica film 104 in dots, and the exposed area of the silica film 104 is greater than the exposed area of the fluororesin particles 102, and adds a reaction-type radical generator having a breakdown effect.

In this way, the excellent antifouling performance against both the hydrophilic staining substance 105 and the hydrophobic property substance 106 is produced. At the same time, it is excellent in the water spreading owing to the hydrophilic property, in restraining the droplet enlargement speed, and in promoting drying. It effectively prevents the dew formation and the adherence of stains, both at the same time, that last over a long time. The firmly adhesive property is improved that does not peel off, at a low cost be cause a large-scale facility is not required.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An air conditioner, comprising:
a chassis;
a ventilation fan that sucks air and blows out the sucked air;
a heat exchanger that exchanges heat between the sucked air and a refrigerant in a refrigerating cycle, arranged inside an airflow route formed by the ventilation fan;
resin-made components installed to a rear flow side of the heat exchanger; and
a coating composition that forms a coating film on surfaces of the resin-made components, that includes silica ultrafine particles and fluororesin particles, wherein the coating film comprises a silica film comprising the silica ultrafine particles and the fluororesin particles partially exposed from a surface of the silica film in dots, and an exposed area of the silica film is greater than an exposed area of the fluororesin particles.

2. The air conditioner according to claim 1, wherein the coating composition comprises a radial generator or a peroxide compound.

3. The air conditioner according to claim 2, wherein the coating component has a weight ratio of silica ultrafine particle content and fluororesin particle content ranging from 30:70 to 95:5.

4. The air conditioner according to claim 2 wherein the coating composition has the silica ultrafine particles having an average particle diameter ranging from 4 to 15 nm.

5. The air conditioner according to claim 2, wherein the coating composition has the fluororesin particles having an average particle diameter ranging from 50 to 500 nm.

6. The air conditioner according to claim 2, wherein the silica ultrafine particle content is 0.1 to 5% by weight.

7. The air conditioner according to claim 2, wherein the silica film in the coating film has an average thickness smaller than the average particle diameter of the fluororesin particle.

8. The air conditioner according to claim 2, comprising: a casing unit that guides the air blown out by the ventilation fan, a right and left vane that blows out the air, flaps that direct the air blown out to upper and lower directions, and a nozzle that forms an airflow route to the casing unit; and
wherein the resin-made components installed to the rear flow side of the heat exchanger is at least one of the casing unit, the right and left vane, the flaps or the nozzle.

* * * * *